US 010187673B2

(12) United States Patent
Newby et al.

(10) Patent No.: US 10,187,673 B2
(45) Date of Patent: *Jan. 22, 2019

(54) INGRESS NOISE INHIBITING NETWORK INTERFACE DEVICE AND METHOD FOR CABLE TELEVISION NETWORKS

(71) Applicant: PPC BROADBAND, INC., East Syracuse, NY (US)

(72) Inventors: Charles F. Newby, Evergreen, CO (US); Gregory F. Halik, Empire, MI (US); Matthew Kellogg, Parker, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,537

(22) Filed: May 24, 2018

(65) Prior Publication Data

US 2018/0270519 A1    Sep. 20, 2018

Related U.S. Application Data

(63) Continuation of application No. 15/587,555, filed on May 5, 2017, now Pat. No. 10,045,056, which is a
(Continued)

(51) Int. Cl.
*H04N 21/24* (2011.01)
*H04L 12/28* (2006.01)
(Continued)

(52) U.S. Cl.
CPC ..... *H04N 21/2408* (2013.01); *H04L 12/2801* (2013.01); *H04L 12/2898* (2013.01);
(Continued)

(58) Field of Classification Search
CPC ............. H04L 12/2801; H04L 12/2898; H04L 12/2834; H04L 12/2838; H04L 12/2861;
(Continued)

(56) References Cited

U.S. PATENT DOCUMENTS 2,662,217 A    12/1953  Roberts
3,608,542 A     9/1971  Pacela et al.
(Continued)

FOREIGN PATENT DOCUMENTS

JP    55-080989 A     6/1980
JP    55-132126 A    10/1980
(Continued)

OTHER PUBLICATIONS

International Search Report dated May 31, 2011, PCT Application No. PCT/US2010/049568, filed Sep. 21, 2010.
(Continued)

*Primary Examiner* — Brian T Pendleton
*Assistant Examiner* — Alan H Luong
(74) *Attorney, Agent, or Firm* — MH2 Technology Law Group LLP

(57) ABSTRACT

Ingress noise from subscriber equipment is mitigated or prevented from reaching a cable television (CATV) network. All upstream signals including ingress noise are initially transmitted to the CATV network whenever their instantaneous power exceeds a threshold which typically distinguishes ingress noise from a valid upstream signal. Whenever the instantaneous power is below the threshold, ingress noise is blocked from reaching the CATV network. A gas tube surge protection device is included to resist component destruction and malfunction arising from lightning strikes and other high voltage, high current surges.

25 Claims, 6 Drawing Sheets

Related U.S. Application Data continuation of application No. 12/250,229, filed on Oct. 13, 2008, now Pat. No. 9,647,851.

(51) Int. Cl.
  *H04N 7/10* (2006.01)
  *H04N 21/61* (2011.01)

(52) U.S. Cl.
  CPC ......... *H04N 7/104* (2013.01); *H04N 21/2402* (2013.01); *H04N 21/6118* (2013.01); *H04N 21/6168* (2013.01)

(58) Field of Classification Search
  CPC .......... H04L 2025/03808; H04H 20/78; H04N 21/6118; H04N 21/6168; H04N 7/102; H04N 7/104; H04N 7/17309; H04N 21/2402; H04N 21/2408
  USPC .......................... 725/124, 78, 125–130, 149
  See application file for complete search history.

(56) References Cited

U.S. PATENT DOCUMENTS

| | | | |
|---|---|---|---|
| 3,790,909 A | 2/1974 | Le Fevre | |
| 3,939,431 A | 2/1976 | Cohlman | |
| 4,027,219 A | 5/1977 | Van Alphen et al. | |
| 4,306,403 A | 12/1981 | Hubbard et al. | |
| 4,344,499 A | 8/1982 | Van Der Lely et al. | |
| 4,418,424 A | 11/1983 | Kawamoto et al. | |
| 4,512,033 A | 4/1985 | Schrock | |
| 4,520,508 A | 5/1985 | Reichert, Jr. | |
| 4,521,920 A | 6/1985 | Forsberg et al. | |
| 4,648,123 A | 3/1987 | Schrock | |
| 4,677,390 A | 6/1987 | Wagner | |
| 4,715,012 A | 12/1987 | Mueller, Jr. | |
| 4,961,218 A | 10/1990 | Kiko | |
| 4,982,440 A | 1/1991 | Dufresne et al. | |
| 5,010,399 A | 4/1991 | Goodman et al. | |
| 5,073,822 A | 12/1991 | Gumm et al. | |
| 5,126,677 A | 6/1992 | Campbell | |
| 5,126,686 A | 6/1992 | Tam | |
| 5,126,840 A | 6/1992 | Dufresne et al. | |
| 5,214,505 A | 5/1993 | Rabowsky et al. | |
| 5,231,660 A | 7/1993 | West, Jr. | |
| 5,235,612 A | 8/1993 | Stilwell et al. | |
| 5,245,300 A | 9/1993 | Sasaki | |
| 5,345,504 A | 9/1994 | West, Jr. | |
| 5,361,394 A | 11/1994 | Shigihara | |
| 5,369,642 A | 11/1994 | Shioka et al. | |
| 5,389,882 A | 2/1995 | I'Anson et al. | |
| 5,485,630 A | 1/1996 | Lee et al. | |
| 5,548,255 A | 8/1996 | Spielman | |
| 5,557,319 A | 9/1996 | Gurusami et al. | |
| 5,557,510 A | 9/1996 | McIntyre et al. | |
| 5,719,792 A | 2/1998 | Bush | |
| 5,740,044 A | 4/1998 | Ehrenhardt et al. | |
| 5,742,591 A | 4/1998 | Himayat et al. | |
| 5,745,836 A | 4/1998 | Williams | |
| 5,745,838 A | 4/1998 | Tresness et al. | |
| 5,815,794 A | 9/1998 | Williams | |
| 5,818,825 A | 10/1998 | Corrigan et al. | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,956,075 A | 9/1999 | Matsuo | |
| 5,970,053 A | 10/1999 | Schick et al. | |
| 6,012,271 A | 1/2000 | Wilkens et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,101,932 A | 8/2000 | Wilkens | |
| H001858 H | 9/2000 | Ibelings | |
| 6,128,040 A | 10/2000 | Shinbori et al. | |
| 6,129,187 A | 10/2000 | Bellanger et al. | |
| 6,160,572 A | 12/2000 | Matsuura | |
| 6,160,990 A | 12/2000 | Kobayashi et al. | |
| 6,173,225 B1 | 1/2001 | Stelzle et al. | |
| 6,185,432 B1 | 2/2001 | Vembu | |
| 6,205,138 B1 | 3/2001 | Nihal et al. | |
| 6,229,375 B1 | 5/2001 | Koen | |
| 6,253,077 B1 | 6/2001 | Burt et al. | |
| 6,321,384 B1 | 11/2001 | Eldering | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,430,904 B1 | 8/2002 | Coers et al. | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,546,705 B2 | 4/2003 | Scarlett et al. | |
| 6,550,063 B1 | 4/2003 | Matsuura | |
| 6,560,778 B1 | 5/2003 | Hasegawa | |
| 6,570,914 B1 | 5/2003 | Ichihara | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,725,463 B1 | 4/2004 | Birleson | |
| 6,728,968 B1 | 4/2004 | Abe et al. | |
| 6,737,935 B1 | 5/2004 | Shafer | |
| 6,757,910 B1 | 6/2004 | Bianu | |
| 6,758,292 B2 | 7/2004 | Shoemaker | |
| 6,785,907 B1 | 8/2004 | Dan et al. | |
| 6,804,828 B1 | 10/2004 | Shibata | |
| 6,843,044 B2 | 1/2005 | Clauss | |
| 6,845,232 B2 | 1/2005 | Darabi | |
| 6,868,552 B1 | 3/2005 | Masuda et al. | |
| 6,877,166 B1 | 4/2005 | Roeck et al. | |
| 6,880,170 B1 | 4/2005 | Kauffman et al. | |
| 6,915,530 B1 | 7/2005 | Kauffman et al. | |
| 6,920,614 B1 | 7/2005 | Schindler et al. | |
| 6,928,175 B1 | 8/2005 | Bader et al. | |
| 6,942,595 B2 | 9/2005 | Hrazdera | |
| 6,973,271 B2 | 12/2005 | Farmer et al. | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,048,106 B2 | 5/2006 | Hou | |
| 7,093,054 B1 | 8/2006 | Goldman | |
| 7,127,734 B1 | 10/2006 | Amit | |
| 7,130,576 B1 | 10/2006 | Gurantz et al. | |
| 7,151,575 B1 | 12/2006 | Landry et al. | |
| 7,154,957 B1 | 12/2006 | Monk et al. | |
| 7,162,731 B2 | 1/2007 | Reidhead et al. | |
| 7,167,693 B2 | 1/2007 | Bachman et al. | |
| 7,251,703 B1 | 7/2007 | Wu et al. | |
| 7,254,827 B1 | 8/2007 | Terreault | |
| 7,283,479 B2 | 10/2007 | Ljungdahl et al. | |
| 7,295,518 B1 | 11/2007 | Monk et al. | |
| 7,399,255 B1 | 7/2008 | Johnson et al. | |
| 7,404,355 B2 | 7/2008 | Viaud et al. | |
| 7,416,068 B2 | 8/2008 | Ray et al. | |
| 7,428,222 B1 | 9/2008 | Wu et al. | |
| 7,428,238 B2 | 9/2008 | El Wardani et al. | |
| 7,433,543 B2 | 10/2008 | Hagiwara | |
| 7,454,252 B2 | 11/2008 | El-Sayed | |
| 7,464,526 B2 | 12/2008 | Coenen | |
| 7,477,871 B1 | 1/2009 | Gurantz et al. | |
| 7,499,397 B1 | 3/2009 | Monk et al. | |
| 7,505,819 B2 | 3/2009 | El-Sayed | |
| 7,508,284 B2 | 3/2009 | Shafer | |
| 7,530,091 B2 | 5/2009 | Vaughan | |
| 7,592,883 B2 | 9/2009 | Shafer | |
| 7,603,693 B2 | 10/2009 | Masuda et al. | |
| 7,631,337 B2 | 12/2009 | King et al. | |

(56) References Cited

U.S. PATENT DOCUMENTS

| | | | |
|---|---|---|---|
| 7,675,381 B2 | 3/2010 | Lin | |
| 7,707,615 B2 | 4/2010 | Musser et al. | |
| 7,742,777 B2 | 6/2010 | Strater et al. | |
| 7,748,023 B2 | 6/2010 | Weinstein et al. | |
| 7,751,718 B2 | 7/2010 | Sage | |
| 8,001,579 B2 | 8/2011 | Olson et al. | |
| 8,213,457 B2 | 7/2012 | Keima et al. | |
| 8,271,235 B2 * | 9/2012 | Czompo | H03M 1/1265 341/122 |
| 8,286,209 B2 | 10/2012 | Egan et al. | |
| 8,401,387 B2 | 3/2013 | Biegert et al. | |
| 8,433,195 B2 | 4/2013 | Biegert et al. | |
| 8,667,550 B2 | 3/2014 | Wang | |
| 8,769,597 B2 | 7/2014 | Wang | |
| 2001/0016950 A1 | 8/2001 | Matsuura | |
| 2002/0083476 A1 | 6/2002 | McNamara | |
| 2002/0141347 A1 | 10/2002 | Harp | |
| 2002/0141494 A1 | 10/2002 | Chappell | |
| 2002/0144292 A1 | 10/2002 | Uemura et al. | |
| 2002/0166124 A1 | 11/2002 | Gurantz et al. | |
| 2002/0174435 A1 | 11/2002 | Weinstein et al. | |
| 2003/0033608 A1 | 2/2003 | Chang | |
| 2003/0084458 A1 | 5/2003 | Ljungdahl et al. | |
| 2003/0106067 A1 | 6/2003 | Hoskins et al. | |
| 2003/0121056 A1 | 6/2003 | Sorenson et al. | |
| 2003/0131127 A1 | 7/2003 | King | |
| 2003/0159084 A1 * | 8/2003 | Murphy | G06F 11/203 714/13 |
| 2004/0073953 A1 | 4/2004 | Xu et al. | |
| 2004/0076192 A1 | 4/2004 | Zerbe et al. | |
| 2004/0147243 A1 | 7/2004 | Morphy | |
| 2004/0147273 A1 | 7/2004 | Morphy | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0047051 A1 | 3/2005 | Marland | |
| 2005/0097154 A1 | 5/2005 | Tsecouras | |
| 2005/0144649 A1 | 6/2005 | Bertonis et al. | |
| 2005/0155082 A1 | 7/2005 | Weinstein et al. | |
| 2005/0183130 A1 | 8/2005 | Sadja et al. | |
| 2005/0210977 A1 | 9/2005 | Yan | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0041918 A9 | 2/2006 | Currivan et al. | |
| 2006/0148406 A1 | 7/2006 | Strater et al. | |
| 2006/0191359 A1 | 8/2006 | Tarasinski et al. | |
| 2006/0205442 A1 | 9/2006 | Phillips et al. | |
| 2006/0241838 A1 | 10/2006 | Mongiardo et al. | |
| 2006/0247273 A1 | 11/2006 | Kawaguchi | |
| 2006/0282871 A1 | 12/2006 | Yo | |
| 2007/0013356 A1 | 1/2007 | Qiu | |
| 2007/0261094 A1 | 11/2007 | Urbanek | |
| 2007/0288981 A1 | 12/2007 | Mitsuse et al. | |
| 2007/0288982 A1 | 12/2007 | Donahue | |
| 2008/0001645 A1 | 1/2008 | Kuroki | |
| 2008/0022344 A1 | 1/2008 | Riggsby | |
| 2008/0040764 A1 | 2/2008 | Weinstein et al. | |
| 2008/0075012 A1 | 3/2008 | Zielinski et al. | |
| 2008/0120667 A1 | 5/2008 | Zaltsman | |
| 2008/0127287 A1 | 5/2008 | Alkan et al. | |
| 2008/0157898 A1 | 7/2008 | Palinkas et al. | |
| 2008/0168518 A1 | 7/2008 | Hsue et al. | |
| 2008/0247401 A1 | 10/2008 | Bhal et al. | |
| 2008/0247541 A1 | 10/2008 | Cholas et al. | |
| 2008/0271094 A1 | 10/2008 | Kliger et al. | |
| 2008/0313691 A1 | 12/2008 | Cholas et al. | |
| 2009/0031391 A1 | 1/2009 | Urbanek | |
| 2009/0047917 A1 | 2/2009 | Phillips et al. | |
| 2009/0077608 A1 | 3/2009 | Romerein et al. | |
| 2009/0098831 A1 | 4/2009 | Deng | |
| 2009/0153263 A1 | 6/2009 | Lin | |
| 2009/0154369 A1 | 6/2009 | Helvig et al. | |
| 2009/0180782 A1 | 7/2009 | Bernard et al. | |
| 2009/0217325 A1 | 8/2009 | Kliger et al. | |
| 2009/0221304 A1 * | 9/2009 | Pudney | H04W 68/00 455/458 |
| 2009/0316608 A1 | 12/2009 | Singh et al. | |
| 2009/0320085 A1 | 12/2009 | Wang | |
| 2009/0320086 A1 | 12/2009 | Rijssemus et al. | |
| 2010/0017842 A1 | 1/2010 | Wells | |
| 2010/0095344 A1 | 4/2010 | Newby et al. | |
| 2010/0100912 A1 | 4/2010 | Olson et al. | |
| 2010/0100918 A1 | 4/2010 | Egan, Jr. et al. | |
| 2010/0100921 A1 | 4/2010 | Olson et al. | |
| 2010/0125877 A1 | 5/2010 | Wells et al. | |
| 2010/0146564 A1 | 6/2010 | Halik et al. | |
| 2010/0194489 A1 | 8/2010 | Kearns et al. | |
| 2010/0225813 A1 | 9/2010 | Hirono et al. | |
| 2010/0266000 A1 | 10/2010 | Froimovich et al. | |
| 2011/0010749 A1 | 1/2011 | Alkan | |
| 2011/0051014 A1 | 3/2011 | Wang et al. | |
| 2011/0069740 A1 | 3/2011 | Cowley et al. | |
| 2011/0072472 A1 | 3/2011 | Wells et al. | |
| 2011/0085452 A1 | 4/2011 | Kelma et al. | |
| 2011/0085480 A1 | 4/2011 | Keima et al. | |
| 2011/0085586 A1 | 4/2011 | Kelma et al. | |
| 2011/0088077 A1 | 4/2011 | Kelma et al. | |
| 2012/0054805 A1 | 3/2012 | Shafer et al. | |
| 2012/0054819 A1 | 3/2012 | Alkan et al. | |
| 2012/0081190 A1 | 4/2012 | Rijssemus | |
| 2014/0105221 A1 | 4/2014 | Bailey | |

FOREIGN PATENT DOCUMENTS

| | | |
|---|---|---|
| JP | 57-091055 A | 6/1982 |
| JP | 58-101582 A | 6/1983 |
| JP | 58-99913 | 7/1983 |
| JP | 59026709 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004080483 | 3/2004 |
| JP | 2005005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

OTHER PUBLICATIONS

Office Action dated Nov. 22, 2011, U.S. Appl. No. 12/255,008, filed Oct. 21, 2008.

U.S. Appl. No. 13/167,497, filed Jun. 23, 2011.

U.S. Appl. No. 13/245,510, filed Sep. 26, 2011.

U.S. Appl. No. 13/333,060, filed Dec. 21, 2011.

Jon-En Wang, "House Amplifier With Return Path Gating", U.S. Appl. No. 12/487,367, filed Jun. 18, 2009.

Jon-En Wang, "Service Provisioning Device With Integrated Cable Modem", U.S. Appl. No. 13/229,493, filed Sep. 9, 2011.

Kang Lin et al., "Return Path Noise Reducing Amplifier With Bypass Signal", U.S. Appl. No. 14/181,636, filed Feb. 15, 2014.

Jon-En Wang, "Amplifier With Noise Reduction", U.S. Appl. No. 14/283,005, filed May 20, 2014.

Krista Susan Jacobson, "Discrete Multi-Tone-Based Communications in the Reverse Channel of Hybrid Fiber-Coax Networks", Thesis, Stanford University, Aug. 1996, pp. 1-161.

* cited by examiner

INGRESS NOISE INHIBITING NETWORK INTERFACE DEVICE AND METHOD FOR CABLE TELEVISION NETWORKS

CROSS-REFERENCE TO RELATED APPLICATIONS

This application is a continuation of U.S. patent applications Ser. No. 15/587,555 filed May 5, 2017, which is a continuation of U.S. patent application Ser. No. 12/250,229 filed Oct. 13, 2008, both of which are incorporated herein by reference.

This invention relates to cable television (CATV) networks, and more particularly to a new and improved CATV network interface device which interconnects subscriber equipment at a subscriber's premises to the CATV network infrastructure. The present network interface device offers an improved capability for inhibiting the amount of undesirable ingress noise introduced from subscriber equipment to the CATV network without diminishing the information content of valid upstream signals and while achieving use compatibility with most CATV networks without regard to upstream communication protocols or unique equipment used in the CATV network.

BACKGROUND OF THE INVENTION

CATV networks supply high frequency "downstream" signals from a main signal distribution facility, known as a "headend," through the CATV network infrastructure to the homes and offices of subscribers to the CATV signal distribution services. The infrastructure of a typical CATV network includes interconnected coaxial cables, signal splitters and combiners, repeating amplifiers, filters, trunk lines, cable taps, drop lines and other signal-conducting devices. The downstream signals are supplied to the subscriber equipment, such as television sets, telephone sets and computers, to cause them to operate.

In addition, most CATV networks also transmit "upstream" signals from the subscriber equipment back to the headend of the CATV network. For example, a set top box allows the subscriber to select programs for display on the television set. Upstream signals are sent from the set top box to the headend signal-delivering equipment that then transmits the selected downstream signal to the subscriber. As another example, two-way communication is essential when using a personal computer connected through the CATV infrastructure to the public Internet. As a further example, voice over Internet protocol (VOIP) telephone sets use the CATV infrastructure and the public Internet as the medium for transmitting two-way telephone conversations. Such two-way signal transmission (upstream and downstream) is therefore an essential requirement for modern CATV networks.

To be effective, a CATV network must use filters and other components which reduce or eliminate unwanted signals that enter the CATV network from external sources. These undesirable external signals, known as "ingress noise," have the effect of degrading valid signals, if measures are not taken to suppress or otherwise limit the amount of ingress noise in a CATV network.

The most intense frequency of undesirable ingress noise signals is in the frequency band of 0-15 megahertz (MHz). Valid upstream signals are within the frequency band of 5-42 MHz, which overlaps with the frequency band of the most intense ingress noise. It is therefore impossible or extremely difficult to filter undesirable ingress noise from valid upstream signals when the two electrical signals occupy the same frequency band and both signals may originate at approximately the same location at the subscriber premises. Valid downstream signals are within the frequency band of 54-1000 MHz, so the ingress noise, typically in the 0-15 MHz frequency band, is usually suppressed by filters in the downstream frequency band.

Even though the ingress noise is typically in a frequency band different from the downstream frequency band, ingress noise can still have adverse influence on both valid downstream and upstream signals. Ingress noise from individual subscribers tends to funnel together and accumulate as a substantial underlying level of base noise on the CATV network. Valid signals must be distinguished from this base level noise, usually by amplifying the valid signals above the base noise level. A high level of base noise may cause signal amplifiers to clip or distort both the valid downstream and upstream signals during amplification and retransmission of those signals, thereby reducing the information contained in those valid signals. A reduction in the information contained in the signals diminishes the quality of service experienced by the subscriber and may even inhibit the delivery of services to subscribers.

There are many potential sources of ingress noise in the environment of a typical CATV network. However, the typical CATV network has a relatively high immunity to ingress noise because the CATV network infrastructure is essentially constructed by professionals using high quality equipment and techniques. However, the situation is usually considerably different at the subscriber premises. The quality of the subscriber equipment, the type and integrity of the signal conductors within the consumer premises, the effectiveness and quality of the connections between the subscriber equipment and the signal conductors, and the presence of many other types of electrical devices which emit noise, such as electric motors, radios and consumer appliances, become sources of ingress noise at the subscriber premises over which the CATV service provider has no control.

Even though the CATV service provider may have little control over the sources of ingress noise at the subscriber premises, the CATV service provider is nevertheless responsible for the quality of service, at least from the perspective of subscribers. Therefore, different types of ingress noise inhibiting devices have been devised for use with CATV networks to attempt to suppress ingress noise entering the CATV network from the subscriber premises.

One type of known ingress noise inhibiting device relies on downstream signals generated at the headend in accordance with the communication protocol to close an electronic switch at predetermined times and under predetermined circumstances to establish an upstream communication path for valid upstream signals. Once the upstream communication is established, the subscriber equipment is permitted to transmit upstream signals in synchronization with the establishment of the path. The upstream signals from subscriber equipment can only be communicated at those times established by the communication protocol. At all other times, all upstream signals, including ingress noise, are blocked and prevented from entering the CATV network. The times when the electronic switch is closed are established by the communication protocol, and those time periods may not correspond with the times when the subscriber makes programming selections, desires to transmit upstream signals, or is talking during a telephone conversation, for example.

Protocol-responsive ingress noise inhibiting devices have the potential to delay the transmission of the upstream communications, and as a result, the response thereto, because the upstream communications path is only established during those predetermined times set by the communication protocol. The times set by the communication protocol do not usually correspond with the times when the user wishes to transmit valid upstream signals. The resulting delays are perceived by the subscriber as deficient responsiveness and a reduction in the quality of service. Furthermore, since the time intervals for transmitting upstream signals is preestablished by the communication protocol, the closed electronic switch permits ingress noise to enter the CATV network during those times when there are no subscriber upstream signals to transmit, thereby allowing ingress noise to enter the CATV network.

A further difficulty with such protocol-responsive ingress noise inhibiting devices is that they are specifically useful only in those types of CATV networks which require a specific communication protocol. Because not all CATV networks operate on the same basis, protocol-controlled ingress noise inhibiting devices do not have wide applicability to a variety of different types of CATV networks and CATV service providers. In addition, synchronizing the subscriber equipment to the CATV network protocol requires specialized equipment.

A related type of ingress noise inhibiting device permits upstream communications in only one or more narrow band pass frequencies, for example at 11 and/or 26 MHz. Filters are employed to block any ingress noise within the other ranges of the 5-42 MHz upstream frequency band and the 0-15 MHz typical ingress noise frequency band. Although such bandpass ingress noise inhibiting devices are effective in suppressing the ingress noise outside of the bandpass frequencies, ingress noise is still able to enter the CATV network at the selected bandpass upstream frequencies. Further, the use of such narrow frequency bandpass ingress noise inhibiting devices is applicable only to those types of CATV networks which limit the frequency of valid upstream signals to preselected frequency bands. The use of preselected upstream frequency bands for valid upstream signals is not universally applicable to a variety of different types of CATV networks and CATV service providers.

Another type of ingress noise inhibiting device is one which responds to an auxiliary out-of-band signal to close an electronic switch and establish an upstream communication path. For example, the auxiliary out-of-band signal may be a 1 MHz tone, which falls outside of the upstream frequency band. The subscriber equipment generates this out-of-band signal whenever it wishes to transmit an upstream communication. The ingress noise inhibiting device responds to the out-of-band signal and closes the electronic switch to establish the communication path for the upstream signal in the 5-42 MHz frequency band. Typically, the out-of-band signal remains present while the upstream signal is transmitted. When the out-of-band signal is not generated, the electronic switch opens to block the communication path, thereby preventing ingress noise from entering the CATV network. Such ingress noise inhibiting devices require the subscriber equipment and set-top boxes to have the additional functionality of generating, recognizing and responding to the out-of-band signal. Such equipment is not common, and adds to the cost and difficulty of the equipment support operations of the CATV service provider. Furthermore, the ingress noise inhibiting device also requires additional components to function in a frequency band different from the normal 5-42 MHz upstream frequency band in which other components operate. Lastly, ingress noise in the out-of-band frequency range can also cause the electronic switch to close and establish the upstream communication path when there is no valid upstream signal to transmit, thereby admitting ingress noise on to the CATV network.

Other types of ingress noise inhibiting devices attempt to distinguish ingress noise from valid upstream signals, on the basis of characteristic differences in the ingress noise signals and the valid upstream signals. Ingress noise is characterized by erratic amplitude and timing variations, while valid upstream signals are characterized by regular amplitude and consistent timing characteristics. Valid upstream signals are frequently transmitted in the form of packets, which are defined by the presence and absence of high-frequency pulses that constitute bits of a digital signal. The typical packet includes a preamble with a series of high-frequency pulses representing digital bits which define the start of the packet. Certain packet-responsive ingress noise inhibiting devices attempt to recognize the preamble, and in response, close an electronic switch to establish a pathway for the valid upstream signal. Distinguishing the preamble requires time to recognize its regular timing and amplitude characteristics. The amount of time available to perform such recognition may not always be adequate, particularly when the high-frequency pulses of the preamble are of low or moderate strength. Under those circumstances, the upstream communication path may not be established quickly enough to transmit the body of substantive information carried by the packet, thereby resulting in loss of some of the information and the perception of a diminished quality of service. Not all CATV networks operate on a digital packet communication protocol, so the applicability of packet-responsive ingress noise inhibiting devices is not universal.

Another difficulty arising from some known ingress noise inhibiting devices involves attempting to switch filters in and out of electrical connection to establish the upstream communication path and to suppress the ingress noise when the upstream communication path is not established. Switching filters in and out of circuit connection requires a finite amount of time for the energy storage inductors and capacitors of such filters to store the necessary energy and to achieve stabilized operability to perform filtering. Of course, the time required to store the energy, achieve stability and commence filtering the signals may also result in truncating or diminishing the information content of the upstream signals.

Still another type of ingress noise inhibiting device attempts to distinguish between spurious ingress noise and valid upstream signals on the basis of their energy content. Such devices function by integrating the power of the signals over time to arrive at an energy value. The assumption is that the power of valid upstream signals, when integrated, will represent an energy content sufficiently greater than the integrated power or energy of spurious ingress noise signals, because valid upstream signals have sustained energy while spurious noise signals have erratic low energy. The sustained length of valid upstream signals integrates to recognizable energy level, while the short and erratic length of ingress noise integrates to a much lesser energy level. After the time period required for integrating the power into energy, the energy level is compared to a predetermined threshold energy level which has been selected to represent a valid upstream signal. If the energy level exceeds the predetermined threshold energy level, an electronic switch is closed to establish the upstream communication path. If the integration of the power results in an energy level which is less than the predetermined threshold energy level, it is assumed that the signal is ingress noise, and the electronic switch remains open to prevent any signals from reaching the CATV network.

To integrate the power level of upstream signals into energy, a time delay is required before valid upstream signals can be transmitted to the CATV network. This delay in transmitting valid upstream signals presents the possibility that some of the valid upstream signal will be lost or truncated before the upstream communication path is established.

SUMMARY OF THE INVENTION

The CATV network interface device and method of this invention are effective in mitigating ingress noise over the entire 5-42 MHz upstream frequency band of a CATV network, and do so while transmitting valid upstream signals almost instantaneously to avoid loss of information content. The valid upstream signals are transmitted without requiring a time delay sufficient to determine energy content. Consequently, valid upstream signals are transmitted almost immediately to the CATV network after the subscriber equipment generates those signals. The almost instantaneous transmission of valid upstream signals avoids the risk of loss of information content. The present device and method is not limited in its applicability or use to any particular type of CATV network or any particular type of communication protocol used on a CATV network. The present ingress noise inhibiting network interface device and method do not require synchronization with CATV network communication protocol or require special functionality in subscriber equipment to synchronize valid upstream signals with the CATV network communication protocol. No out-of-band signaling or functionality is required to implement the present invention. Upon termination of the valid upstream signal, the present device and method quickly revert to a condition which effectively blocks ingress noise from the CATV network. No filters are switched into or out of electrical connection. When blocking ingress noise from the CATV network, the connections to the CATV network and to the subscriber equipment are terminated into characteristic impedances to minimize reflected signals that detract from valid signals.

In accordance with these and other features, one aspect of the present invention involves a network interface device which has an upstream noise mitigation circuit that mitigates the ingress of noise from subscriber equipment into a cable television (CATV) network. The CATV network transmits downstream signals in a first frequency band from a headend to the subscriber equipment and transmits upstream signals in a second different frequency band from the subscriber equipment to the headend. The ingress noise mitigation circuit comprises a downstream filter which filters downstream signals before delivery to the subscriber equipment, and an upstream filter which filters upstream signals before delivery to the CATV network. A detector determines an instantaneous level of power of the upstream signals. A threshold circuit establishes a predetermined threshold power level which distinguishes typical ingress noise from valid upstream signals. A comparator compares the instantaneous power level of the upstream signal with the threshold power level and asserts a trigger signal when the instantaneous power level exceeds the threshold power level. A switch is connected to the upstream filter and terminates the upstream filter in a characteristic impedance to block upstream signals and to prevent or minimize signal reflection when in a normal position. The switch conducts the upstream signals from the subscriber equipment to the CATV network when in an activated position. The switch assumes the activated position when the instantaneous power level exceeds the threshold power level, as represented by the assertion of the trigger signal, and assumes the normal position under usual circumstances and when the instantaneous power level is less than the threshold power level, represented by the de-assertion of the trigger signal. By activating the switch immediately after the instantaneous power content of the upstream signal exceeds the threshold power level, there is little possibility or opportunity for the information contained in the upstream signals to be lost, truncated or diminished.

Other aspects of the network interface device involve a timer which is operative to maintain the switch activated for a predetermined time period after the instantaneous power level exceeds the threshold power level and which is operative to return the switch to the normal position after expiration of a predetermined time period after the switch is activated. The predetermined time is sufficient to transmit a single valid maximum-length upstream signal. The continued presence of energy from multiple valid sequential upstream signals maintains the switch in the activated position to permit transmission of those signals. Should ingress noise have an instantaneous power level sufficient to exceed the threshold power level, the switch will quickly resume the normal position and prevent further transmission of the ingress noise after the ingress noise dissipates.

Additional aspects of the network interface device involve first and second upstream filters which filter the upstream signals before delivery to the CATV network, and first and second switches connected to the first and second upstream filters. The first and second switches assume activated positions in response to the instantaneous power content exceeding the threshold power level and assume normal positions in response to the instantaneous power content remaining below the threshold power level. In the normal positions, the two switches terminate the filters through characteristic impedances to prevent ingress noise from the subscriber equipment from reaching the CATV network. In the activated positions, the two switches conduct the upstream signals through the first and second upstream filters.

Another aspect of the present invention is a network interface device which includes a gas tube surge protection device. The gas tube surge protection device shunts high voltage and high current surges, such as those arising from lightning, from CATV network components and the subscriber equipment.

A method of mitigating upstream noise originating from subscriber equipment is a further aspect of the present invention. The method involves filtering upstream signals including upstream noise to confine the frequency of the upstream signals to an upstream frequency band, determining an instantaneous power content of the upstream signals, establishing a threshold power level which typically distinguishes ingress noise from valid upstream signals, comparing the instantaneous power content of the upstream signals to the threshold power level, blocking the filtered upstream signals from the CATV network when the instantaneous power content is less than the threshold power level, and conducting the filtered upstream signals to the CATV network when the instantaneous power content is at least equal to the threshold power level.

Other features of the method involve conducting upstream signals to the CATV network for a predetermined time period after the instantaneous power content exceeds the threshold power level. The instantaneous power content is integrated over a predetermined integration time to arrive at an integration value. If the integration value is less than a predetermined threshold energy level, thereby signifying ingress noise, the upstream communication path is blocked to prevent the ingress noise from reaching CATV network after the predetermined integration time has elapsed. If the integration value is greater than the predetermined threshold energy level, thereby signifying the presence of a valid upstream signal, the upstream communication path is maintained for the time duration of a single valid maximum-length upstream signal. If the integration value is greater than the predetermined threshold energy level, thereby signifying the presence of a valid upstream signal, and the instantaneous power of the valid upstream signal continues after the time duration of a maximum-length upstream signal, the valid upstream signal is constituted by a sequence of multiple valid upstream signals. In this circumstance, the upstream communication path is maintained for the time duration of the multiple valid upstream signals. In the respective cases of a single valid upstream signal or multiple sequential valid upstream signals, maintaining the upstream communication path for the duration of a single maximum-length upstream signal assures or for the duration of the multiple sequential valid upstream signals assures that the information contained in the valid upstream signals will be fully and accurately transmitted without truncation or other loss of information. After the time duration of a single valid maximum-length upstream signal or the time duration of a sequence of multiple valid upstream signals, the upstream communication path is terminated to block ingress noise from entering the CATV network.

Other features and aspects of the invention, and a more complete appreciation of the present invention, as well as the manner in which the present invention achieves the above and other improvements, can be obtained by reference to the following detailed description of presently preferred embodiments taken in connection with the accompanying drawings, which are briefly summarized below, and by reference to the appended claims.

DETAILED DESCRIPTION

Figure 1:
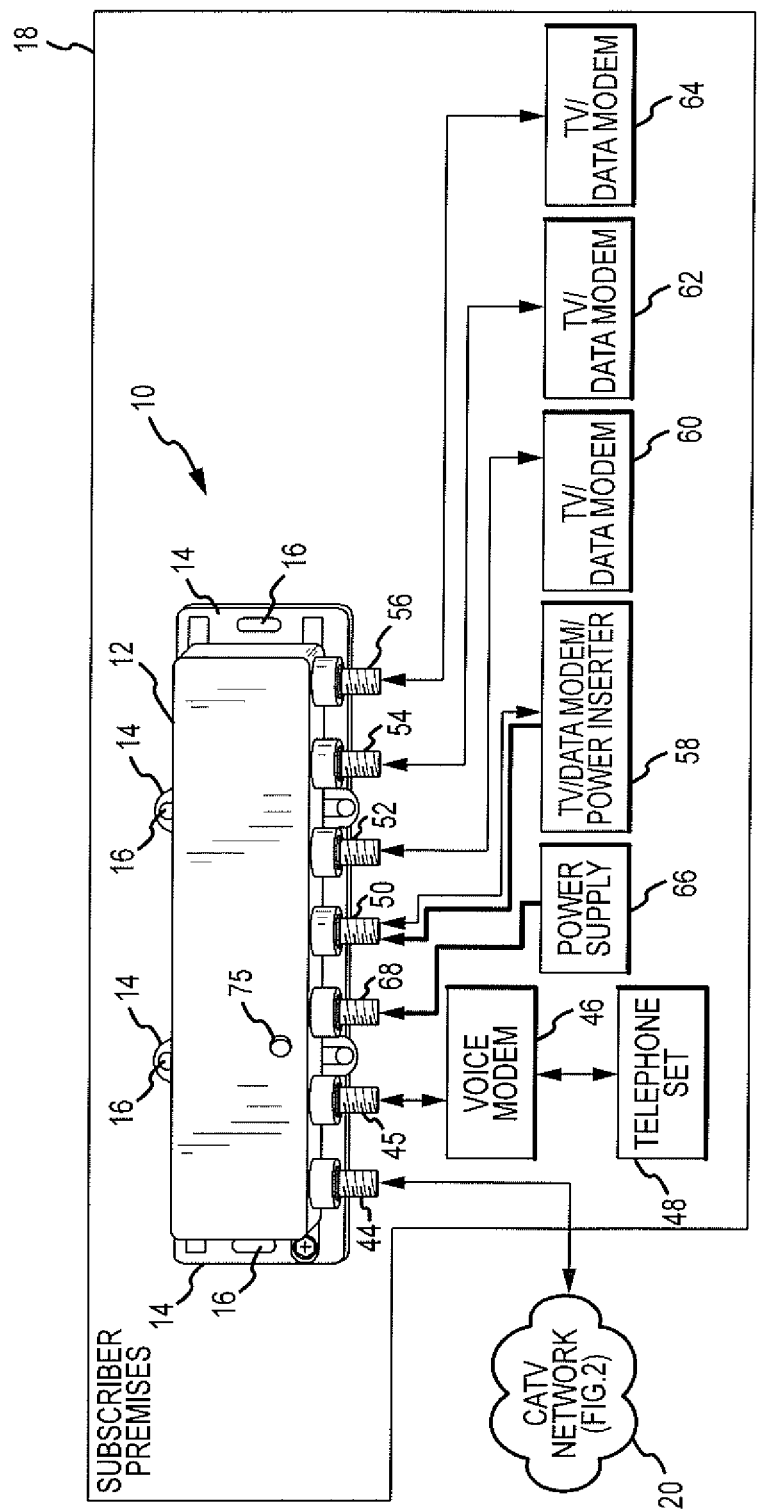
FIG. 1 is a perspective view of a network interface device which incorporates the present invention and a block diagram of subscriber equipment shown connected to a CATV network through the network interface device located at a subscriber's premises.

A network interface device 10 which incorporates the present invention is shown in FIG. 1. The network interface device 10 includes a housing 12 which encloses internal electronic circuit components (shown in FIGS. 3 and 7). A mounting flange 14 surrounds the housing 12, and holes 16 in the flange 14 allow attachment of the interface device 10 to a support structure at a subscriber's premises 18.

Figure 2:
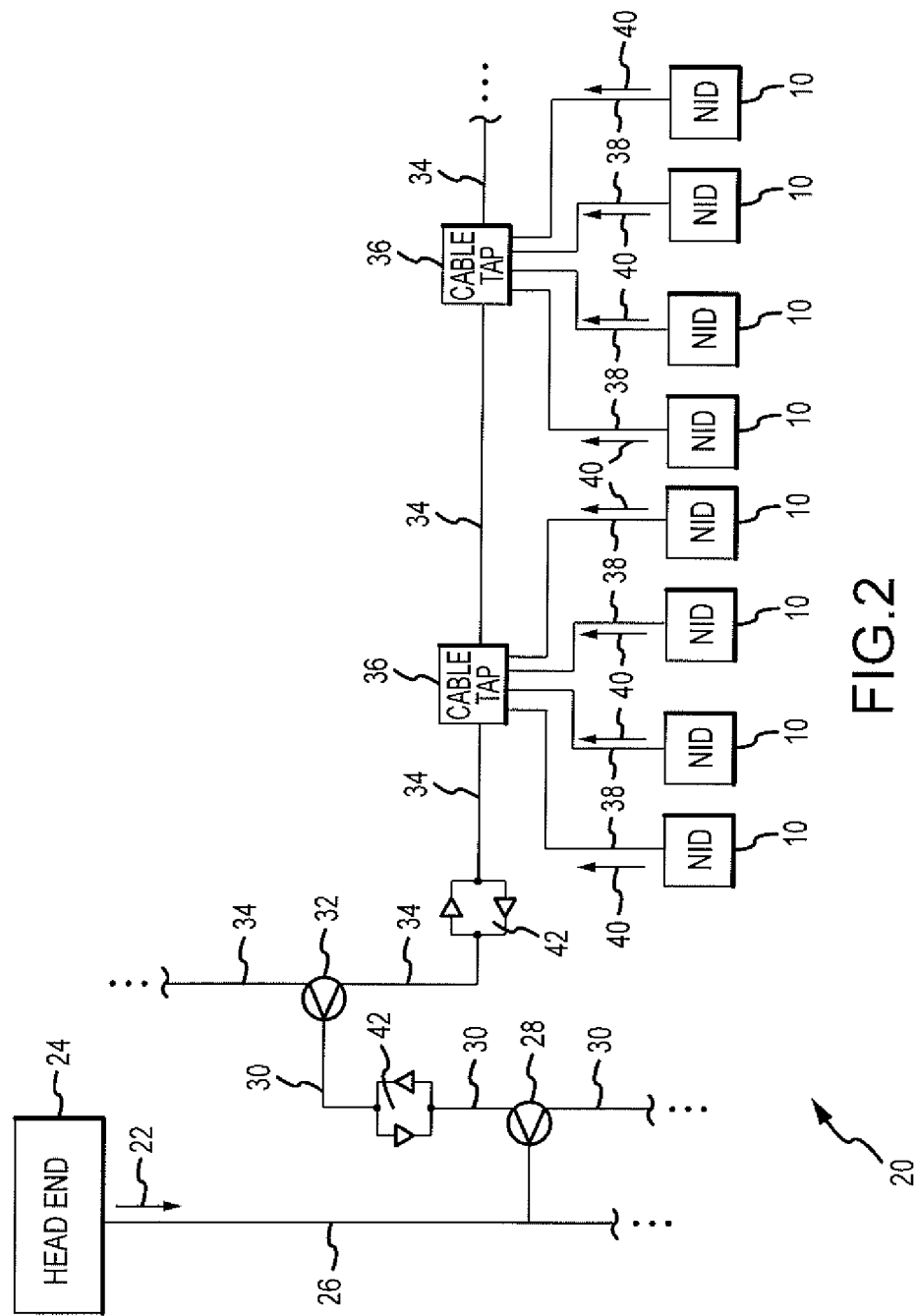
FIG. 2 is a block diagram of portions of a typical CATV network, with multiple network interface devices of the type shown in FIG. 1 connected by drop cables to cable taps, as well as other aspects of the CATV network.

The interface device 10 is connected to a conventional CATV network 20, which is shown in a typical topology in FIG. 2. Downstream signals 22 originate from programming sources at a headend 24 of the CATV network 20, and are conducted to the interface device 10 in a sequential path through a main trunk cable 26, a signal splitter/combiner 28, secondary trunk cables 30, another signal splitter/combiner 32, distribution cable branches 34, cable taps 36, and drop cables 38. Upstream signals 40 are delivered from the network interface device 10 to the CATV network 20, and are conducted to the headend 24 in a reverse sequential path. Interspersed at appropriate locations within the topology of the CATV network 20 are conventional repeater amplifiers 42, which amplify both the downstream signals 22 and the upstream signals 40. Conventional repeater amplifiers may also be included in the cable taps 36. The cable taps 36 and signal splitter/combiners 28 and 32 divide a single input downstream signal into separate downstream signals, and combine multiple upstream signals into a single upstream signal.

The network interface device 10 receives the downstream signals 22 from the CATV network 20 at a network connection port 44. The downstream signals 22 are either passive or active. Passive downstream signals are those signals which are conducted through the interface device 10 without amplification, enhancement, modification or other substantial conditioning. The passive downstream signals are delivered from a passive port 45 to passive subscriber equipment, such as a voice modem 46 connected to a telephone set 48, or an embedded multimedia network interface device (EMTA, not shown), located at the subscriber premises 18. Active downstream signals are those signals which are amplified, filtered, modified, enhanced or otherwise conditioned by power-consuming active electronic circuit components within the interface device 10. The conditioned active downstream signals are divided into multiple copies and delivered from a plurality of active ports 50, 52, 54 and 56 to active subscriber equipment located at the subscriber premises 18, such as television (TV) sets and/or data modems 58, 60, 62 and 64. Other subscriber equipment, such as data processing devices or computers, is connected to the data modems.

The equipment at the subscriber premises 18 typically generates upstream signals 40 (FIG. 2) to the network interface device 10 for delivery to the CATV network 20. The upstream signals 40 may be either active or passive upstream signals generated by the subscriber equipment connected to the active and passive ports 45, 50, 52, 54 and 56. For example, one or more of the TV sets 58, 60, 62 and 64 may have conventional set top boxes (not shown) associated with them to allow the subscriber/viewer to make programming and viewing selections. Of course, any computers (not shown) connected to the data modems 58, 60, 62 and 64 typically communicate upstream signals. The telephone set 48 and the voice modem 46, or the EMTA (not shown), also generate upstream signals as a part of their typical functionality.

Electrical power for the network interface device 10 is supplied from a conventional DC power supply 66 connected to a dedicated power input port 68. Alternatively, electrical power can be supplied through a conventional power inserter (also shown at 58) that is connected to the port 50. The power inserter allows relatively low voltage DC power to be conducted through the same port 50 that also conducts high-frequency signals. Use of a conventional power inserter connected to one of the ports, e.g. port 50, eliminates the need for a separate dedicated power supply port 68, or provides an alternative port through which electrical power can also be applied. The power supply 66 or the power supplied from the port 50 is typically derived from a conventional wall outlet (not shown) within the subscriber premises 18.

The ports 44, 45, 50, 52, 54, 56 and 68 are each preferably formed by a conventional female coaxial cable connector which is mechanically connected to the housing 12 and which is electrically connected to internal components of the interface device 10. Coaxial cables from the subscriber equipment and the drop cables 38 (FIG. 2) are connected to the interface device 10 by mechanically connecting the corresponding mating male coaxial cable connector (not shown) on these coaxial cables to the female coaxial cable connectors forming the ports 44, 45, 50, 52, 54, 56 and 68.

Figure 3:
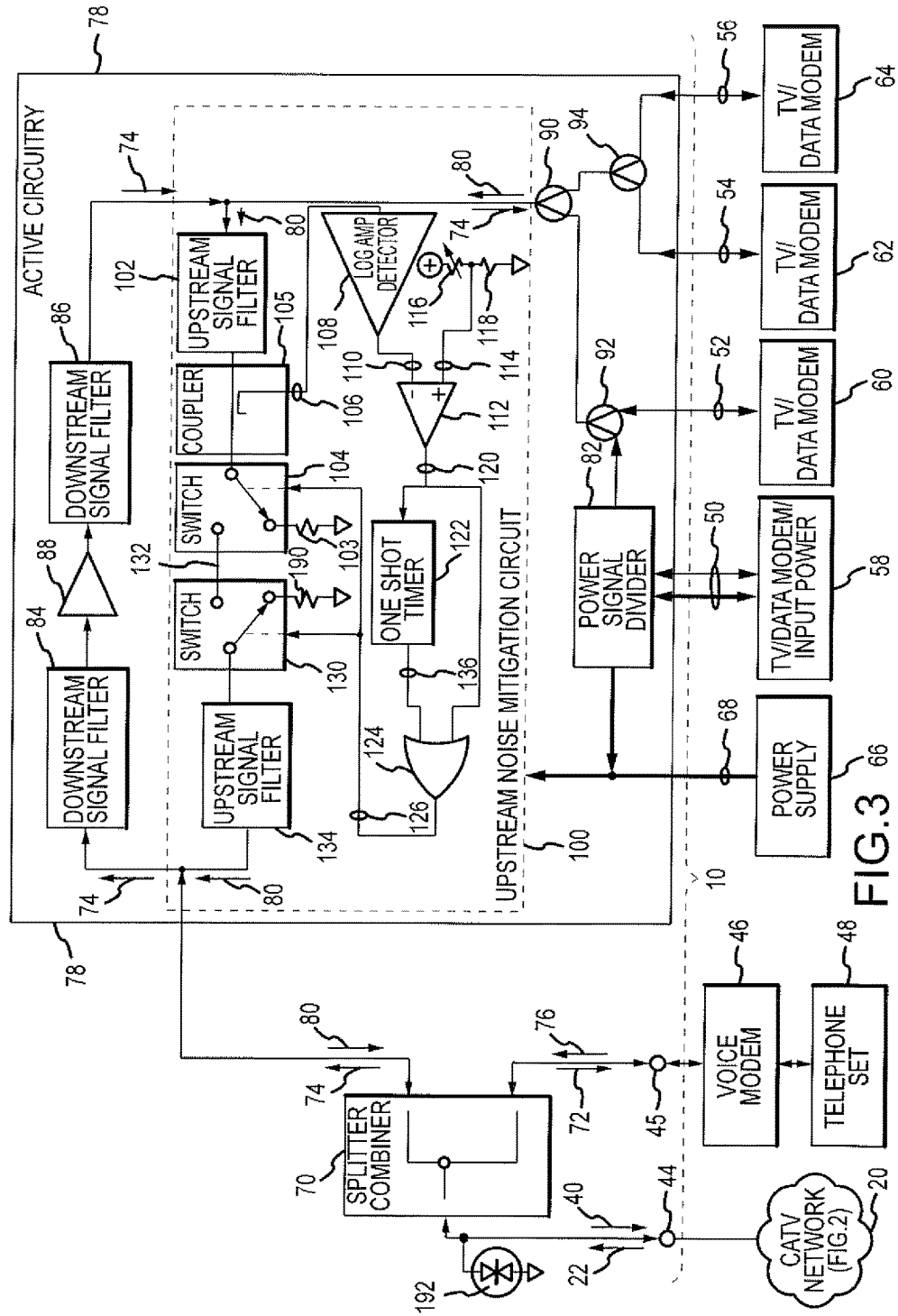
FIG. 3 is a block diagram of basic functional components within the network interface device shown in FIG. 1.

The internal circuit components of one embodiment of the network interface device 10 are shown in FIG. 3. Those internal circuit components include a conventional bi-directional signal splitter/combiner 70 which separates the input downstream signals 22 from the CATV network 20 at the cable port 44 into passive downstream signals 72 and active downstream signals 74 within the network interface device 10. The passive downstream signals 72 are conducted directly through the passive port 45 to the passive subscriber equipment 46 and 48. Passive upstream signals 76 created by the passive subscriber equipment 46 and 48 are conducted through the passive port 45 directly to the signal splitter/combiner 70 to become upstream signals 40 in the CATV network 20. The direct signal conductivity path for the passive signals in the network interface device 10 avoids subjecting the passive signals to potentially adverse influences from electronic components that might fail or malfunction, thereby enhancing the reliability of the passive communications without increasing the risk of failure. Passive communications are intended to be as reliable as possible since they may be used in emergency and critical circumstances.

The active downstream signals 74 are conducted to active circuitry 78, where the active downstream signals 74 are amplified, filtered, modified, enhanced or otherwise conditioned before delivery through the active ports 50, 52, 54 and 56 to the subscriber equipment 58, 60, 62 and 64. Active upstream signals 80 are created by the subscriber equipment 58, 60, 62 and 64, and also pass through the active circuitry 78, where those signals are also conditioned or otherwise modified or enhanced before being combined at the signal splitter/combiner 70 to become network upstream signals 40 in the CATV network 20.

The circuit components of the active circuitry 78 receive power from the power supply 66 connected at port 68 or through the power inserter 58 (FIG. 1) connected at port 50. A conventional power-signal divider 82 separates the high-frequency active downstream and upstream signals 74 and 80 at port 50 from the DC power at port 50. The divider 82 conducts the active signals 74 and 80 from and to high-frequency signal conductivity paths within the active circuitry 78, while simultaneously conducting the DC power to the active circuitry 78 for use by its electrical power consuming components. Electrical power from the dedicated power input port 68 is also conducted to the power consuming circuit components of the active circuitry 78.

The components of the active circuitry 78 which conduct the downstream active signals 74 include first and second analog downstream filters 84 and 86 that are connected in series by a linear amplifier 88. The downstream filters 84 and 86 filter the downstream signals 74 in the downstream 54-1000 MHz frequency band. The linear amplifier 88 amplifies, modifies or enhances the downstream signals 74, and in conjunction with the filters 84 and 86, conditions the downstream signals 74. The downstream signals 74 are thereafter connected through conventional signal splitter/combiners 90, 92 and 94 before those downstream signals 74 are delivered through the active ports 50, 52, 54 and 56 to the subscriber equipment 58, 60, 62 and 64.

The active upstream signals 80 created by the subscriber equipment 58, 60, 62 and 64 are conducted through the active ports 50, 52, 54 and 56 to an upstream noise mitigating circuit 100. The upstream noise mitigation circuit 100 transfers valid active upstream signals 80 from the subscriber equipment 58, 60, 62 and 64 through the network interface device 10 to the CATV network 20 as upstream signals 40. These functions are accomplished as described below.

Valid upstream signals from the subscriber equipment 58, 60, 62 and 64 are conducted through the signal splitter/combiners 92, 94 and 90 to become active upstream signals 80. The upstream signals 80 are applied to a first upstream signal bandpass filter 102. Because the downstream signal filter 86 passes signals only in the 54-1000 MHz band, valid upstream signals 80 in the frequency band of 5-42 MHz are blocked by the downstream signal filter 86 and diverted through the upstream signal filter 102. The first upstream signal filter 102 preferably passes signals in the valid upstream signal frequency range of 5-42 MHz. Typical ingress noise falls within most intensely within the frequency range of 0-15 MHz, so the first upstream filter 102 has the capability of removing ingress noise at the low frequencies in the range of 0-5 MHz. However, ingress noise in the range of 5-15 MHz will be conducted by the upstream signal filter 102.

To mitigate or prevent ingress noise upstream signals from entering the CATV network 20 from the network interface device 10, ingress noise signals conducted through the first upstream filter 102 are isolated by a first radio frequency (RF) single pole double throw (SPDT) electronic switch 104 and terminated to ground through a termination resistor 103. The termination resistor 103 is connected to one terminal of the first electronic switch 104. Signals from the first upstream signal filter 102 are conducted through a conventional directional coupler 105 to and through the switch 104 to the termination resistor 103 while the first electronic switch 104 is in a normal position, shown in FIG. 3. All signals conducted through the first upstream signal filter 102 are terminated through the termination resistor 103, and are thereby prevented from entering the CATV network 20, while the first switch 104 is in its normal position.

The first electronic switch 104 changes to an alternate activated position (not shown in FIG. 3) upon the instantaneous power of the signals conducted through the filter 102 reaching a magnitude indicative of a valid upstream signal from the subscriber equipment 58, 60, 62 or 64. To distinguish relatively low power ingress noise from the relatively higher power of a valid upstream signal, the instantaneous magnitude of the power of the signals passing through the upstream filter 102 is detected and evaluated. The coupler 105 delivers a signal 106 which is typically 10 dB lower in power than the signal passing through the coupler 105 to the switch 104.

The signal 106 from the coupler 105 is conducted to an input terminal of a conventional log amplifier detector 108. The log amplifier detector 108 operates on an inverse logarithmic basis to convert the instantaneous magnitude of power of the signal 106 to a DC voltage output signal 110. By operating on an inverse logarithmic basis, the typical decibel power of the input signal 106 is converted into a linear DC voltage output signal 110 whose magnitude is inversely related to the instantaneous input power. This logarithmic conversion allows the log amplifier detector 108 to function as an instantaneous demodulating power detector whose output DC voltage signal is inversely proportional to the logarithm of the input power. A log amp detector 108 which is satisfactory for use in the present invention is part number AD 8319 available from Analog Devices of Norwood Mass., USA. The DC voltage output signal 110 therefore represents the inverse of the instantaneous power of the upstream signal 80 conducted through the directional coupler 105.

The DC voltage output signal 110 from the log amp detector 108 is applied to a negative input terminal of a comparator 112. A threshold signal 114 is applied to the positive input terminal of the comparator 112. The threshold signal 114 is derived from a resistor divider network such as a potentiometer 116 and a resistor 118 connected in series, or from another voltage source. Adjustment of the value of the potentiometer 116 adjusts the magnitude of the threshold signal 114. The adjustment of the threshold signal 114 establishes the level where an trigger signal 120 from the comparator 112 switches from a logic low level to a logic high level.

The magnitude of the DC voltage output signal 110 from the log amp detector 108 is inversely related to the magnitude of the instantaneous power of the upstream signal represented by signal 106. That is, when the magnitude of the upstream signal 106 is relatively large, the DC voltage output signal 110 from the log amp detector 108 is relatively small, and vice versa. Because of this inverse relationship, the DC voltage output signal 110 is applied to the negative input terminal of the comparator 112, and the threshold signal 114 is applied to the positive input terminal of the comparator 112. Applying the two input signals in this manner causes the comparator 112 to supply a logic high trigger signal 120 whenever the magnitude of the instantaneous power of the upstream signal exceeds a predetermined threshold power level representative of a valid upstream signal. Conversely, when the DC voltage output signal 110 is greater than the signal 114, the trigger signal 120 from the comparator 112 is at a logic low level. When the DC voltage output signal 110 is less than the signal 114, the trigger signal 120 from the comparator is at a logic high level. The logic high level of the signal 120 therefore represents the condition where the instantaneous power of the upstream signal exceeds the predetermined threshold power level established by the signal 114.

Upon sensing that the instantaneous power content of an upstream signal exceeds the level represented by the predetermined threshold power level, the upstream signal is immediately transmitted or passed to the CATV network 20 as a network upstream signal 40. Upstream signals which do not meet the threshold power level are considered ingress noise. Ingress noise signals are isolated from the CATV network 20 by the switches 104 and 130, while incident upstream signals 80 are simultaneously terminated to ground through the termination resistor 103. The functions of passing upstream signals to the CATV network and terminating upstream signals to ground are accomplished in response to the logic level of the trigger signal 120 from the comparator 112.

When instantaneous power content of an upstream signal exceeds the threshold power level, the resulting logic high signal 120 from the comparator 112 triggers a one-shot timer 122. Simultaneously, the logic high signal 120 is applied to an input terminal of an OR gate 124. The OR gate 124 responds by applying a logic high control signal 126 to the control terminals of the first SPDT RF electronic switch 104 and a second SPDT RF electronic switch 130. The electronic switches 104 and 130 normally occupy the positions shown in FIG. 3. Upon the assertion of logic high control signal 126, the switches 104 and 130 immediately change from their normal positions (shown in FIG. 3) to their opposite activated positions (not shown). The activated positions of the switches 104 and 130 establish a direct connection over conductor 132 between the switches 104 and 130. Since the electronic switches 104 and 130 switch with radio frequency speed, the switches 104 and 130 assume the activated position almost instantaneously in response to the assertion of the control signal 126.

The activated positions of the switches 104 and 130 conduct the upstream signal 80 from the first upstream signal filter 102 through the conductor 132 to a second upstream signal filter 134. Both filters 102 and 134 suppress frequencies other than those in the frequency band of 5-42 MHz. The valid upstream signal flows from the second upstream filter 134 through the signal splitter/combiner 70 into the cable network 20 as the network upstream signal 40. Terminating resistors 103 and 190 are connected to the filters 102 and 134 when the switches 104 and 130 are in their normal positions, and the filters 102 and 134 are connected together over the conductor 132 when the switches 104 and 130 are in their activated positions.

Valid upstream signals are conducted to the CATV network almost instantaneously when the instantaneous power level of the upstream signals exceeds the threshold power level. By responding almost instantaneously when the threshold power level is exceeded, the chances are minimized that the information contained in the valid upstream signal will be lost, as might be the case if the power of the upstream signal had to be integrated over a time period before a determination of a valid upstream signal could be made on the basis of energy content. Such integration raises the possibility that some of the information of the upstream signal will be lost and not transferred upstream. In contrast, no integration of the power of the upstream signal over a selected time period is required in the upstream noise mitigation circuit 100. By almost instantaneously transmitting upstream signals which have a power content that exceeds the predetermined threshold power level, the integrity of the information contained in the upstream signal is better preserved.

Once the switches 104 and 130 have been moved to the activated position which directly connects the first and second upstream signal filters 102 and 134 through the conductor 132, the switches 104 and 130 are maintained in this activated position for a time determined by the one-shot timer 122. When triggered by the logic high signal 120, the one-shot timer 122 immediately supplies a logic high output signal 136 to the OR gate 124. Either logic high signal 120 or 136 causes the OR gate 124 to supply the logic high control signal 126. If the power level of the upstream signal falls below the level of the threshold signal 114, the signal 120 immediately assumes a logic low level. However, the one-shot timer 122 will continue to deliver the logic high output signal 136 for the time duration of its internal time constant.

The internal time constant of the one-shot timer 122 is equal to the amount of time to transmit a single valid upstream signal packet of the maximum time duration permitted by the signaling protocol, plus a slight additional amount of time to account for inherent tolerances in the components and the timing of the one-shot timer 122. In this manner, the one-shot timer 122 ensures that the switches 104 and 130 assume their activated positions for a long enough time to conduct all single valid upstream signals, including a maximum-length valid upstream signal or packet.

Figure 4:
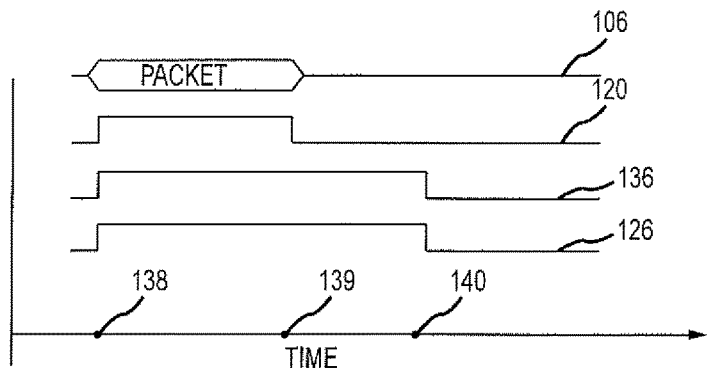
FIGS. 4, 5 and 6 contain multiple waveform diagrams on a common time axis, illustrating the functional features of an upstream noise mitigation circuit of the network interface device shown in FIG. 3.

The situation just described is illustrated by the waveform diagrams shown in FIG. 4, taken in connection with FIG. 3. The signal 106 represents a single valid upstream packet of the permitted maximum time duration whose detection by the log amp detector 108 produces the logic high trigger signal 120. The signal 120 assumes the logic high level at time point 138, triggering the one-shot timer 122 and causing the output signal 136 to be asserted at the same time point 138. The control signal 126 from the OR gate 124 immediately assumes a logic high level at time point 138. The electronic switches 104 and 130 assume their activated positions for the duration of the logic high control signal 126. At time point 139, the maximum time duration of a single valid upstream packet or signal ends, and the instantaneous power represented by that signal falls below the threshold power level represented by the threshold signal 114. The signal 120 assumes a logic low level. Since the time constant of one-shot timer 122 is established to slightly exceed the maximum time duration of a single valid upstream packet or signal, the logic high signal 136 will continue to time point 140. When the signal 136 assumes a logic low level after the one-shot timer 122 times out at time point 140, the control signal 126 from the OR gate 124 simultaneously assumes a logic low level. As a result, the control signal 126 is longer in duration than signal 120. When the control signal 126 assumes the low logic level at time point 140, the electronic switches 104 and 130 assume their normal positions to conduct any upstream signals to the termination resistor 103, thereby terminating those signals to ground and preventing the further upstream signals from reaching the CATV network.

For multiple valid upstream signal packets which are consecutively transmitted without a substantial time interval separating the multiple sequential upstream packets, the one-shot timer 122 will time out before the valid upstream signal transmission terminates. However, the continuous instantaneous power of the multiple sequential valid upstream signal packets will continue to exceed the threshold power level for the duration of the multiple sequential signal packets, thereby causing the comparator 112 to continue to assert the logic high trigger signal 120 to the OR gate 124 for the duration of the multiple sequential signal packets. The continued application of the logic high signal 120 causes the OR gate 124 to assert the logic high control signal 126 beyond the time when the one-shot timer 122 times out. The two upstream signal filters 102 and 134 remain connected by the switches 104 and 130 in their activated positions, and thereby conduct the multiple sequential upstream signal packets to assure that the full information represented by the multiple sequential signal packets is not truncated or lost by premature termination of those signals. At the termination of such multiple upstream signal packets, the signal power no longer exceeds the threshold signal 114, and the switches 104 and 130 immediately assume their normal positions, thereby preventing any ingress noise from entering the CATV network 20 after the longer or multiple sequential valid upstream packets have been transmitted.

Figure 5:
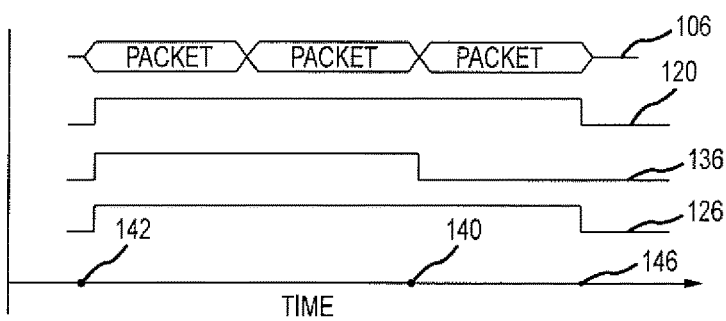

The situation just described is illustrated by the waveform diagrams shown in FIG. 5, taken in conjunction with FIG. 3. The signal 106 represents three, for example, sequential valid upstream packets or signals. The trigger signal 120 assumes the logic high level at time point 142 in response to recognizing the first of the sequential valid upstream packets. The one-shot timer 122 is triggered and causes the output signal 136 to be asserted at time point 142. The control signal 126 from the OR gate 124 also assumes a logic high level at time point 142 in response to the assertion of the control signal 136. The electronic switches 104 and 130 assume their activated positions in response to the logic high control signal 126. At time point 140, the one-shot timer 122 times out, causing its output signal 136 to assume a logic low level. However, the instantaneous power level from the multiple sequential upstream signal packets continues to exceed the threshold power level, until the sequence of multiple upstream signal packets terminates at time point 146. So long as the signal 120 is at a logic high level, the control signal 126 from the OR gate 124 causes the electronic switches 104 and 130 to remain in the activated position, conducting the multiple sequential valid upstream signal packets to the CATV network 20. Once the sequence of multiple valid upstream signal packets has been transmitted, which occurs at time point 146, the absence of any further valid upstream signal causes the instantaneous power level to fall below the threshold power level, and the signals 120 and 126 assume a logic low level. The electronic switches 104 and 130 respond by assuming their normal positions to prevent the further transmission of upstream signals to the CATV network.

If the instantaneous power of ingress noise exceeds the threshold power level, the electronic switches 104 and 130 assume their activated positions, as can be understood from FIG. 3. An unusually high and short duration power level of ingress noise can cause this situation. Under that circumstance, the trigger signal 120 assumes a logic high level, and the one-shot timer 136 is triggered and asserts the output signal 136. The electronic switches 104 and 130 assume their activated positions, allowing the ingress noise to pass through the upstream filters 102 and 134. Until the one-shot timer 122 times out, ingress noise will be allowed to enter the CATV network 20. The effect of this ingress noise is minimized by the time constant of the one-shot timer 122 extending only for the maximum time duration of the longest single valid upstream signal packet permitted under the communication protocol.

Figure 6:
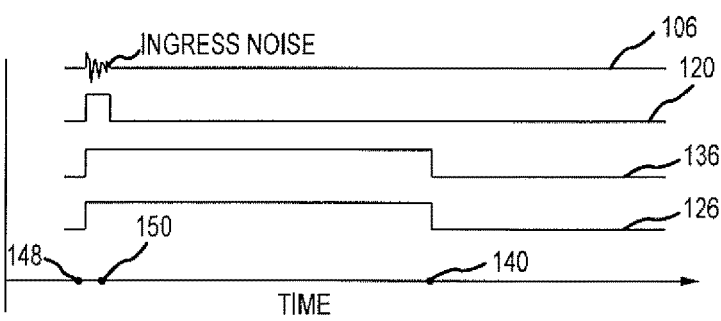

The response to ingress noise having instantaneous power that exceeds the threshold is illustrated by the waveform diagrams shown in FIG. 6, taken in connection with FIG. 3. The ingress noise signal is shown at 106. Because the instantaneous power of the ingress noise exceeds the threshold, a logic high trigger signal 120 is asserted from the comparator 112 at time point 148, thereby triggering the one-shot timer 122 and causing the signal 136 to be asserted at the same time point 148. The logic high signal 136 causes the OR gate 124 to assert the logic high control signal 126 at time point 148. The electronic switches 104 and 130 assume their activated positions for the duration of the high level of the control signal 126. At time point 150, the instantaneous power from the ingress noise falls below the threshold power level, causing the comparator 112 to assert a logic low trigger signal 120. However, the one-shot timer 122 has not timed out and continues to deliver the logic high signal 136 for the time duration of its time constant, until time point 140. The control signal 126 from the OR gate 124 transitions to a logic low level at time point 140 when the one-shot timer 122 times out, causing the electronic switches 104 and 130 (FIG. 3) to assume their normal positions. The electronic switch 104 connects the termination resistor 103 to terminate any further upstream signals to ground and thereby prevent any further transfer of upstream signals to the CATV network.

Figure 7:
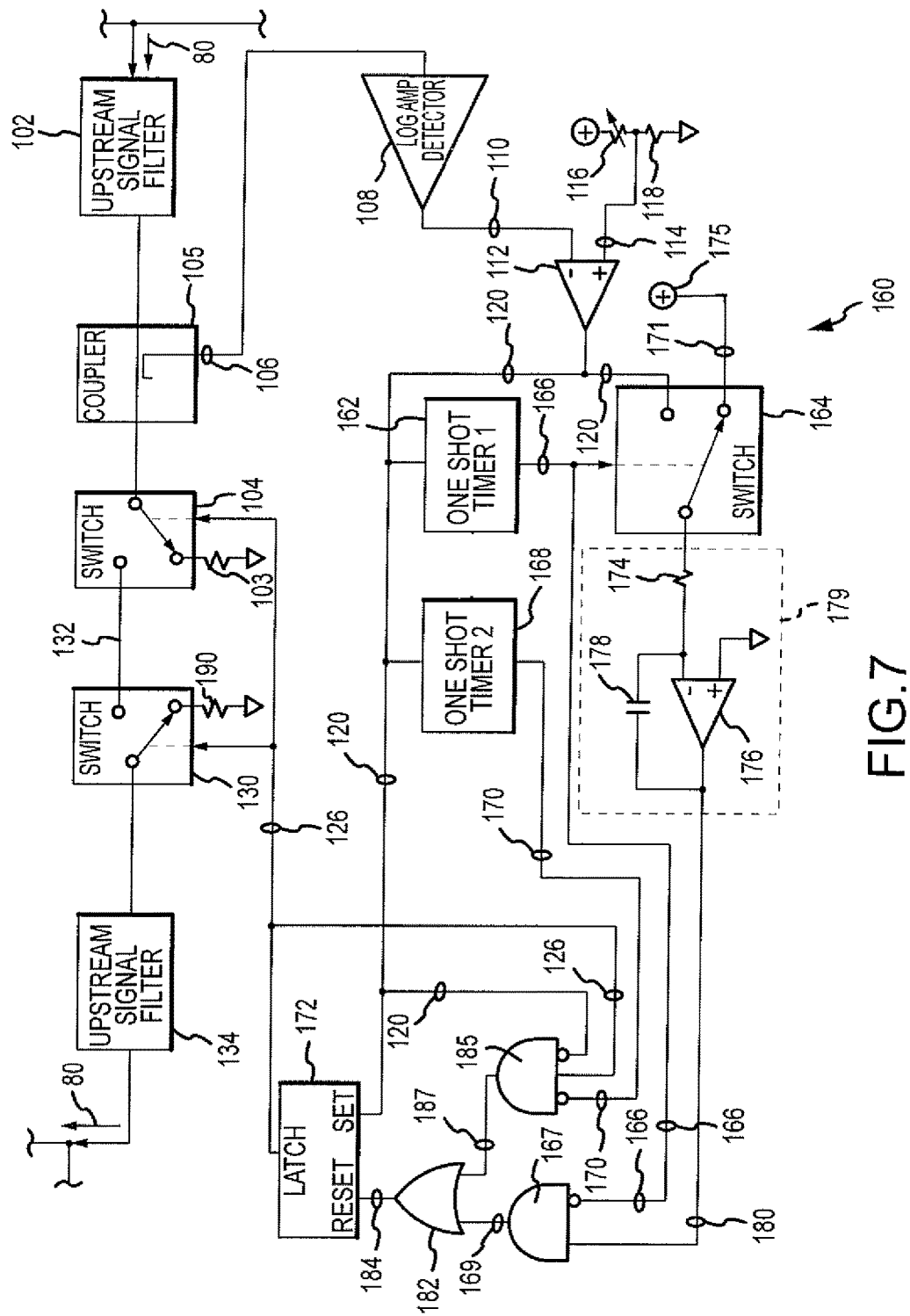
FIG. 7 is a block diagram of basic functional components of an upstream noise mitigation circuit which is an alternative to that shown in FIG. 3.

An alternative form 160 of the upstream noise mitigation circuit, shown in FIG. 7, reduces the amount of time that ingress noise may be conducted to the CATV network 20 after the initial instantaneous power of the ingress noise is sufficient to exceed the threshold power level, compared to the response of the circuit 100 (FIG. 3). The upstream noise mitigation circuit 160 shown in FIG. 7 includes many of the same components as the upstream noise mitigation circuit 100 (FIG. 3), and those same components function in the manner previously described.

In response to the instantaneous power of the ingress noise exceeding the threshold power level, represented by signal 114, the comparator 112 supplies the logic high trigger signal 120, in the manner previously described. The logic high trigger signal 120 is applied to a one-shot timer 162, to the input terminal of a SPDT RF electronic switch 164, to a second one-shot timer 168, and to the set terminal of a set-reset latch 172. In response to the logic high signal 120, the first one-shot timer 162 triggers and supplies an output signal 166. Simultaneously, the second one-shot timer 168 is triggered and supplies a signal 170. The latch 172 is immediately set in response to the logic high trigger signal 120 and supplies the control signal 126 to the RF electronic switches 104 and 130, causing them to switch to their activated positions and establish the upstream signal communication path for conducting upstream signals through the upstream signal filters 102 and 134. In this manner, the noise mitigation circuit 160 responds almost instantaneously to the instantaneous power of the upstream signal exceeding the threshold to immediately conduct the upstream signal to the CATV network without delay and without the risk of diminishing or losing some of the information contained in the upstream signal. In this regard, the upstream noise mitigation circuit 160 (FIG. 7) is similar in initial response to the upstream noise mitigation circuit 100 (FIG. 3). However, the upstream noise mitigation circuit 160 has the capability of more quickly closing the upstream communication path through the switches 104 and 130 when the upstream communication path was initially established in response to ingress noise.

The rapid closure of the upstream communication path in response to ingress noise is accomplished by integrating the signal 120 for a predetermined time established by the time constant of the one-shot timer 162. The logic high trigger signal 120 represents the power of the ingress noise exceeding the predetermined threshold power level. Integrating the logic high trigger signal 120 results in a value which represents energy above the threshold power level for the time duration of integration. Integration occurs over the time that the signal 166 is asserted by the one-shot timer 162. If the amount of power integrated during this time, i.e. energy, is not sufficient to confirm a valid upstream signal with continuous sustained instantaneous power, the switches 104 and 130 are moved to their normal positions, thereby terminating the upstream communication path. Since ingress noise generally does not contain significant sustained energy even though an initial burst of the ingress noise may have sufficient instantaneous power to exceed the threshold, the upstream communication path is quickly closed in a typical ingress noise situation.

Integrating the power represented by the threshold power level is accomplished by an integration circuit 179. The integration circuit 179 includes an operational amplifier 176. The positive input terminal of the operational amplifier 176 is connected to ground reference. A capacitor 178 is connected between the negative input terminal and the output terminal of the operational amplifier 176. The negative input terminal of the operational amplifier 176 is the input point for signals to the integration circuit 179.

Prior to commencement of integration, the switch 164 is in its normal position shown in FIG. 7. In the normal position of the switch 164, a positive voltage signal 171 is conducted from a power supply source 175 to a resistor 174 which is connected to the negative input terminal of an operational amplifier 176. Applying the positive voltage to the negative input terminal of the operational amplifier 176 has the effect of causing integration across the capacitor 178 to establish an output signal 180 at a voltage level near the ground reference. A voltage level near the ground reference constitutes a logic low signal. Thus, in the normal position of the switch 164, the output signal 180 from the integrator circuit 179 is at a logic low level.

In response to the control signal 166 moving the switch 164 from its normal position shown in FIG. 7 to its activated position which is the alternate of that position shown in FIG. 7, the logic high trigger signal 120 is applied through the resistor 174 to the negative input terminal of the operational amplifier 176. So long as the trigger signal 120 is at the logic high level, the output signal 180 from the operational amplifier 176 remains at a logic low level. However, because ingress noise typically has the effect of rapidly subsiding in instantaneous power, the instantaneous power will usually not exceed the threshold for a significant sustained amount of time, thereby causing the signal 120 to assume a logic low level during the time that the one-shot timer 162 supplies the control signal 166. Consequently, with the switch 164 in the activated position and the signal 120 at a logic low level, the operational amplifier 176 integrates this change of input signal level across the capacitor 178, which causes the output signal 180 to start increasing from the ground reference level. If the instantaneous power of the ingress noise remains low for a significant portion of the time that the one-shot timer 162 asserts the control signal 166, as is typical with ingress noise having an initial momentarily-high instantaneous power burst, the voltage across the capacitor 178 will increase to a level which corresponds to a logic high level of the signal 180.

The logic high output signal 180 is applied to one input terminal of an AND gate 167. The control signal 166 is applied to another input terminal of the AND gate 167. The input terminal to which the control signal 166 is applied is an inverting input terminal, thereby causing the AND gate 167 to respond to the inverted logic level of the control signal 166. The signal 180 remains at a logic high level for a time period after integration ceases from the integration circuit 179, and the control signal 166 assumes the logic low level at the end of the integration time established by the one-shot timer 162. At that point, the AND gate 167 responds to two logic high signals (the logic low signal 166 is inverted at the input terminal), resulting in a logic high level signal 169 applied to an OR gate 182. The OR gate 182 supplies a logic high level signal 184 to a reset terminal of the latch 176. The latch 176 resets, and de-asserts the control signal 126 to the switches 104 and 130, thereby closing the upstream communication path through the upstream filters 102 and 134. Thus, soon after the initial instantaneous power of the ingress signal diminishes and the integration time set by the one-shot timer 162 expires, the upstream communication path is closed to the further conduction of upstream signals, thereby preventing any further ingress noise from entering the CATV network.

During the time and situation just described, another AND gate 185 has no effect on the functionality. The signal 170 supplied by the one-shot timer 168 is asserted for a considerably longer period of time than the one-shot timer 162 asserts the control signal 166. The time of assertion of the signal 170 is the length of time, plus a margin for component tolerances, of the longest single valid upstream packet or signal permitted under the signal communication protocol. The time of integration represented by the assertion of the control signal 166 is considerably less than the longest single valid upstream packet. During the integration of the instantaneous power of the ingress noise over the time duration of the control signal 166, the output signal 170 is at a logic high level, the control signal 126 is at a logic high level because the latch 172 will have been set by the trigger signal 120, before the signal 120 assumes a logic low level after the initial high instantaneous power of the ingress noise has dissipated. The input terminals of the AND gate 185 to which the signals 120 and 170 are applied are inverting. Thus, under these conditions, the AND gate 185 supplies an output signal 187 at a logic low level.

Figure 8:
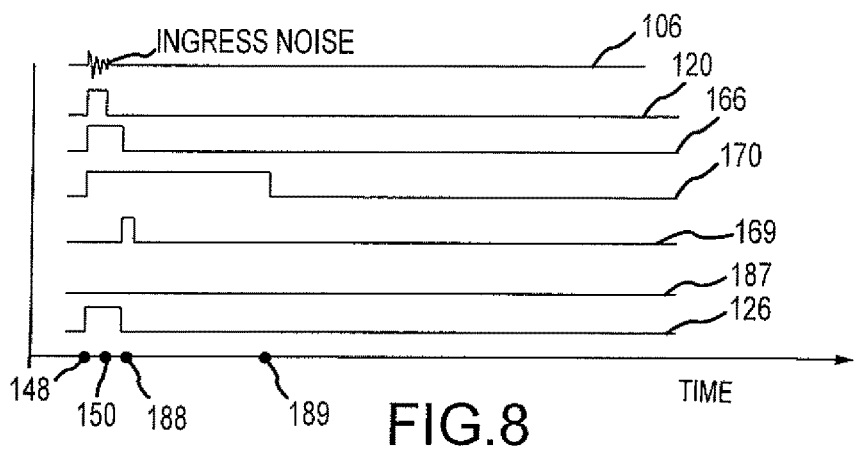
FIGS. 8, 9 and 10 contain multiple waveform diagrams on a common time axis, illustrating the functional features of the upstream noise mitigation circuit shown in FIG. 7.

The situation of terminating the upstream communication path created by a burst of ingress noise before expiration of the time duration of a maximum-length valid upstream signal or packet is illustrated by the waveform diagrams shown in FIG. 8, taken in connection with FIG. 7. The ingress noise signal is shown at 106. The instantaneous power of the ingress noise exceeds the threshold power level and causes a logic high trigger signal 120 from the comparator 112 at time point 148, thereby triggering the one-shot timers 162 and 168 and causing the control signals 166 and 170 to be asserted at the time point 148. The control signal 126 from the latch 172 also assumes a logic high level at time point 148 because the logic high trigger signal 120 sets the latch 172. The electronic switches 104 and 130 assume their activated positions for the duration of the logic high control signal 126 to maintain the upstream communication path. At time point 150, the instantaneous power of the ingress noise falls below the threshold power level, and the trigger signal 120 assumes a logic low level. However, the first one-shot timer 162 has not timed out and continues to deliver the control signal 166 until it times out at time point 188. The time duration between time points 148 and 188 is the time constant of the one-shot timer 162 which establishes the time duration of integration. The time for integrating a valid upstream signal is the time between time points 148 and 188.

If the integrated value indicates an upstream signal of unsustained instantaneous power, consistent with ingress noise that rapidly dissipates, the resulting logic high signal 180 from the integrator 179 is applied to the OR gate 182. The OR gate 182 supplies the logic high signal 180 at time point 188 which, when logically anded with the logical inversion of signal 166, causes the AND gate 167 to assert the signal 169. The OR gate 182 responds by asserting a logic high signal 184, which resets the latch 172, thereby de-asserting the control signal 126. The upstream communication path is terminated when the switches 104 and 130 assume their normal positions.

As is understood from FIG. 8, the upstream communication path remains open from time point 148 to time point 188. This time is considerably less than the maximum time length of a single valid upstream packet or signal, represented by the time between points 148 and 189, or between time points 148 and 150 (FIG. 6). Consequently, even though the upstream communication path is immediately established to allow upstream signal communication whenever the instantaneous power exceeds the threshold, that upstream communication path is closed to further upstream communication very rapidly thereafter if spurious ingress noise established that communication path.

Whenever an upstream signal has sustained instantaneous power, the noise mitigation circuit 160 assures that the upstream signal will be conducted to the CATV network. Such circumstances indicate a valid upstream signal. As understood from FIG. 7, the trigger signal 120 is asserted at a logic high level when the valid upstream signal exceeds the threshold. The latch 172 is set and asserts the logic high control signal 126 which moves the switches 104 and 132 their activated positions to establish the upstream communication path. The timers 162 and 168 are triggered, and the one-shot timer 162 moves the switch 164 to its activated position. The output signal 180 remains at a logic low level during the time of a valid upstream signal while the one-shot timer 162 asserts the control signal 166 and while the logic high trigger signal 120 remains at a logic high level due to the sustained instantaneous power of the valid upstream signal exceeding the threshold. The logic low signal 180 and the inversion of the logic high signal 166 at the input terminal of the AND gate 167 causes the AND gate 167 to assert a logic low signal 169, which has no effect on the OR gate 182 or the latch 172. Thus, during the transmission of a valid upstream signal, the AND gate 167 has no effect on the status of the latch 172.

On the other hand, the time constant of the one-shot timer 168 is considerably longer than the time constant of the one-shot timer 162. The signal 170 from the timer 168 is asserted for the time duration of a single valid maximum-length upstream packet or signal. The logic high level of the signal 170 is inverted at the input terminal of the AND gate 185. At this time, the control signal 126 is at a logic high level because the latch 172 has been set. The continuous instantaneous power of the valid upstream signal is represented by a logic high level of the trigger signal 120. The logic high level of the signal 120 is inverted at the AND gate 185. The logic level of the signals applied to the AND gate 185 causes it to supply a logic low signal 187, which has no effect on the latch 172 during conditions of sustained instantaneous power from the valid upstream signal.

When the valid upstream signal terminates, the logic high level of the signal 120 changes to a logic low level. The logic low level signal 120 is inverted at its input terminal to the AND gate 185. The logic high signal 170 is still asserted by the one-shot timer 168, because the timer 168 times the duration of a single valid maximum-length upstream signal. Until the one-shot timer 168 de-asserts the signal 170, the AND gate 185 will not assert a logic high signal 187. However, when the signal 170 is de-asserted, the AND gate 185 applies the logic high signal 187 to the OR gate 182. The OR gate 182 asserts the signal 184 to reset the latch 172, and the control signal 126 is de-asserted. The switches 104 and 132 move to their normal positions and terminate the upstream communication path through the filters 102 and 134.

In response to sustained instantaneous power representative of a valid upstream signal, the noise mitigation circuit 160 assures that an upstream communication path will be established for the maximum time duration of a single valid upstream signal, provided that there is sufficient instantaneous energy in the upstream signal during the integration time established by the signal 166. In this manner, the circuit 160 is similar to the circuit 100 (FIG. 3) which assures that the upstream communication path remains established for the time duration of a single valid maximum-length upstream signal or packet. However, unlike the circuit 100 (FIG. 3) the circuit 160 discriminates between short-duration high instantaneous power ingress noise and continuous-duration high instantaneous power upstream signals and rapidly terminates the upstream communication path in response to the former.

Figure 9:
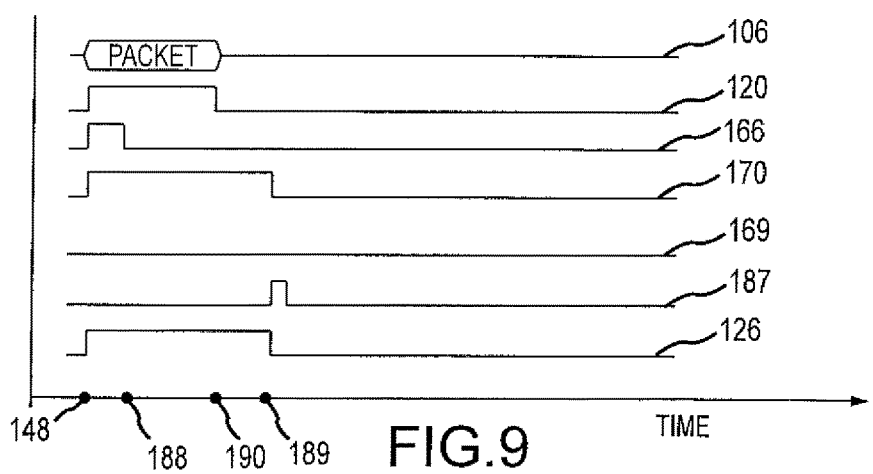

The situation of maintaining the upstream communication path in response to sustained instantaneous energy of an upstream signal during the integration time established by the time constant of the one-shot timer 162, to allow adequate time for a single valid upstream packet of maximum duration to be transmitted, is illustrated by the waveform diagrams shown in FIG. 9, taken in connection with FIG. 7. The upstream signal is represented by a packet having a time duration less than the maximum allowed time duration for single valid upstream packet as shown at 106. The instantaneous power of the upstream packet 106 exceeds the threshold power level and causes a logic high trigger signal 120 from the comparator 112 at time point 148, thereby triggering the one-shot timers 162 and 168 and causing the control signals 166 and 170 to be asserted at the same time point 148. The control signal 126 from the latch 172 also assumes a logic high level at time point 148 due to the assertion of the logic high signal 120. The electronic switches 104 and 130 assume their activated positions for the duration of the logic high signal 126 and establish the upstream communication path. At time point 188, the first one-shot timer 162 times out and de-asserts the control signal 166. The time duration between time points 148 and 188 establishes the time duration of integration.

During the time of integration, the instantaneous power of the single packet 106 continuously exceeds the threshold level. Consequently, the output signal 180 from the integration circuit 179 remains at a logic low level, and the inversion of the control signal 166 at the AND gate 167 maintains the output signal 169 in a logic low level. At time point 188 when the one-shot timer 162 times out, the control signal 166 assumes a logic low level, but the inversion of that logic low level at the input terminal to the AND gate 167, coupled with the continuous logic low level signal 180 continues to maintain the output signal 169 at a logic low level. The logic low signal 169 does not change for the duration of the situation shown in FIG. 9. As a result, the AND gate 167 has no effect on resetting the latch 172 in this situation.

During the time between points 148 and 188, the logic high control signal 126, the logic high trigger signal 120, which is inverted at its input terminal to the AND gate 185, and the logic high control signal 170, which is also inverted at its input terminal to the AND gate 185, cause the output signal 187 from the AND gate 185 to remain at a logic low level. Therefore, during this time between points 148 and 188, the signal 187 from the AND gate 185 has no effect on resetting the latch 172.

At time point 190 the packet 106 terminates. The instantaneous power associated with the packet 106 also terminates, causing the trigger signal 120 to achieve a logic low level. However, the one-shot timer 168 has not yet timed out, so its output signal 170 remains at a logic high level until time point 189. The logic low level trigger signal 120 does not change the state of the AND gate 185. Consequently, the latch with 172 remains set at time point 190.

When the one-shot timer 168 times out, at point 189, the control signal 170 assumes a low logic level. The low logic signal 170 is inverted at its input terminal to the AND gate 185. The trigger signal 120 previously assumed a logic low level at time point 190. The inversion of the signals 120 and 170 at the input terminals to the AND gate 185 results in three logic high input signals to the AND gate 185, causing the output signal 187 to assume a logic high level. The logic high signal 187 is applied to the OR gate 182, and the output signal 184 from the OR gate resets the latch 172. Upon reset, the latch 172 de-asserts the control signal 126 at time point 189, thereby closing the upstream communication path through the filters 102 and 134 as a result of the switches 104 and 130 assuming their normal positions.

Thus, as is understood from FIG. 9, a valid upstream signal of any duration will exceed the minimum power threshold measured during the integration time established by the one-shot timer 162, and as a consequence, the latch 172 will continue to assert the control signal 126 and maintain the upstream communication path through the filters 102 and 104. The upstream communication path will be maintained for the duration of the time constant of the one-shot timer 168, during which its output signal 170 is asserted at a logic high level. By maintaining the upstream communication path during the time that the one-shot timer 168 asserts the control signal 170, it is assured that all valid upstream signals having a time length at least equal to the maximum length of a single valid upstream signal will pass through the upstream communication path. Consequently, none of the information contained in a single valid upstream packet will be lost or truncated.

The upstream signal communication path remains established during the time between the actual end of the valid upstream packet and the end of a maximum-length valid upstream packet, represented by the difference in time between points 190 and 189, but that amount of time is relatively short and maintenance of the upstream communication path during this time assures that a valid upstream signal packet of any length up to the maximum length will be transmitted without loss or truncation of any of its information.

In addition to the previously described advantages of quickly closing the upstream communication path after it was established by ingress noise and of establishing the upstream communication path for the maximum length of a valid upstream signal, the noise mitigation circuit 160 also has the capability of transmitting multiple sequential valid data packets, without loss or truncation of information. This situation can be understood by reference to FIG. 10, taken in conjunction with FIG. 7.

Figure 10:
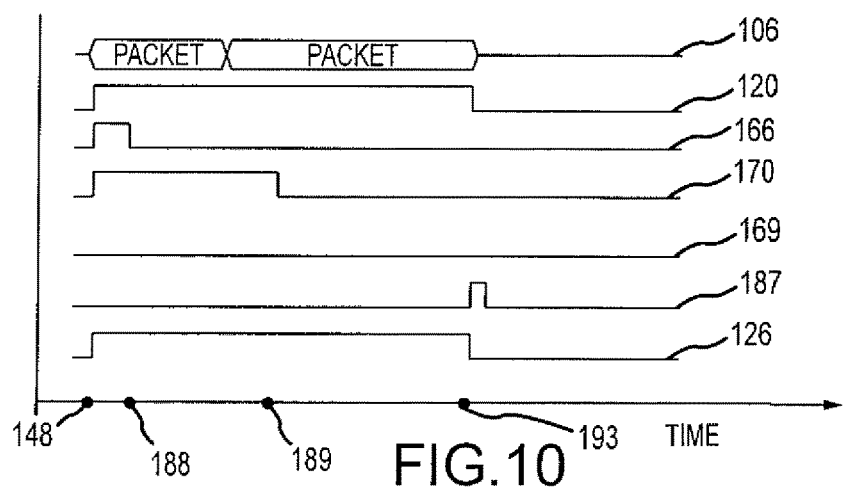

The first valid upstream packet of the multiple sequence of valid upstream packets, shown at 106 in FIG. 10, establishes the upstream communication path due to its sustained instantaneous energy. This energy is sustained during the integration time established by the one-shot timer 162. The control signal 166 is asserted at a high logic level until time point 188, and the control signal 170 is asserted at a high logic level until time point 189.

The instantaneous power of the sequence of multiple valid upstream packets remains above the threshold level and the trigger signal 120 remains asserted at a logic high level for the duration of that sequence of packets until time point 193, when the instantaneous power of the multiple sequential upstream packets terminates. The one-shot timer 168 does not time out until time point 189, at which point its output signal 170 assumes a logic low level at time point 189. The low logic level of the control signal 170 is inverted at its input terminal to the AND gate 185. However, at time point 189, the states of the input signals to the AND gate 185 result in the AND gate 185 supplying a logic low output signal 187. The logic low output signal 187 has no effect on the OR gate 182 and the latch 172 remains set.

At time point 193, the instantaneous power of the sequence of multiple valid upstream packets 106 falls below the threshold, causing the trigger signal 120 to assume a logic low level. The logic low level of the signal 120 at time point 193 is inverted at its input terminal to the AND gate 185, causing the AND gate to assert a logic high output signal 187. The logic high signal 187 causes the OR gate 182 to assert the signal 184, thereby resetting the latch 172 and de-asserting the signal 126. The switches 104 and 130 assume their normal positions, thereby terminating the communication path through the upstream signal filters 102 and 134.

In this manner, the upstream communication path is maintained for the duration of the multiple sequential packets, represented by the time between points 148 and 193. However, after the last packet in the multiple sequential series of valid upstream packets ends, the upstream communication path is closed to the further transmission of upstream signals, thereby preventing ingress noise from entering the CATV network.

As has been described in conjunction with FIGS. 7-10, any upstream signal, whether a valid upstream signal or ingress noise, which has sufficient instantaneous power to exceed the threshold will immediately open the upstream communication path through the filters 102 and 134. In this sense, the noise mitigation circuit 160 does not distinguish between a valid upstream signals and invalid ingress noise which may have sufficient energy to exceed the threshold. Not distinguishing between these signals assures that there is no delay in transmitting valid upstream signals. A delay in transmitting valid upstream signals could lose or truncate part of the information contained in those valid signals. However, once the upstream communication path has been established, the sustained instantaneous power of the upstream signal is integrated during the integration time established by the one-shot timer 162, between time points 148 and 188. If the instantaneous power of the upstream signal is not sustained, as is the typical case with ingress noise, the upstream communication path is terminated thereafter at time point 188. On the other hand, if the instantaneous power of the upstream signal is sustained during the integration time, as is the typical case with a valid upstream signal of any duration, the upstream communication path is maintained for the maximum duration of a single valid upstream signal or packet, represented by the time between points 148 and 189. In this manner, an upstream communication path is assured for the time duration necessary to transmit a single valid upstream packet of maximum time duration established by the communication protocol. Again, no loss or truncation of information of any valid upstream packet is assured. Similarly, there is no loss or truncation of the information contained in a sequence of multiple valid upstream packets, even when the multiple sequential upstream packets have a time duration which exceeds the maximum time duration of a single valid upstream packet. The upstream communication path remains open for the duration of the multiple sequential upstream packets, represented by the time between points 148 and 193. However as soon as the instantaneous power represented by the multiple upstream sequential packets falls below the threshold, at time point 193, the upstream communication path is terminated to prevent any ingress noise from entering the CATV network at the conclusion of the multiple sequential upstream packets.

The benefit of the termination resistors 103 and 190 is their ability to avoid signal reflections, as understood from FIGS. 3 and 7. The proclivity for high-frequency signals to reflect is related to the impedance characteristic of the termination of the conductor which conducts those signals and to the frequency of those signals, as is well known. For this reason, coaxial cables are typically terminated by connecting a terminating impedance between the signal-carrying center conductor and the surrounding reference plane shielding. The terminating impedance value should have a value equal to a characteristic impedance between the signal-carrying conductor and the reference plane shielding, to minimize signal reflections.

The values of the termination resistors 103 and 190 are selected to equal the characteristic impedance of the coaxial cables which form the drop cables 38 (FIG. 2), and that value is typically 75 ohms. Matching the value of the termination resistors 103 and 190 to the characteristic impedance of the coaxial cables minimizes the amount of signal reflection. Reflected signals combine with the incident downstream signals and cancel or degrade the downstream signals. Minimizing the signal reflection maximizes the quality and fidelity of the downstream signals and enhances the quality of service provided from the CATV network.

A further significant feature is the incorporation of a gas tube surge protection device 192 in the network interface device 10, as shown in FIG. 3. The gas tube surge protection device 192 is an integral component and is permanently enclosed within the housing 12 (FIG. 1). The gas tube surge protection device 192 provides protection against destruction of and damage to the components of the interface device 10 which typically might arise from lightning strikes to the CATV network 20 or from other unanticipated high voltage and high current applications to the CATV network. Because the infrastructure of the CATV network extends over a considerable geographical area, a lightning strike or other unexpected high voltage, high current application may adversely affect or destroy electronic components in the CATV network infrastructure, including the interface devices 10. For this reason, industry standards require some form of surge protection.

The typical previous types of surge protectors are inductor-capacitor circuits, metal oxide varistors, and avalanche diodes. These devices may be made a part of a network interface device, or these devices are included in cable taps 36 (FIG. 2). Inductor-capacitor circuits, metal oxide varistors and avalanche diodes only offer effective protection against relatively lower voltage and lower current surges. Inductor-capacitor circuits, metal oxide varistors and avalanche diodes are susceptible to failure in response to higher voltage and higher current surges, such as those arising from lightning strikes. Of course, the failure of such devices eliminates any protection and usually leads to failure of the components within the CATV network and within the network interface device. The CATV service provider is required to replace failed network interface devices, but a failed surge protector may not be recognized until after the destruction of other components has occurred.

Grounding blocks are another previous form of surge protection. Grounding blocks are devices used in cable taps 36 (FIG. 2), and include conductors which provide a common ground reference among the various devices within the cable taps 36. Grounding blocks may also be used in connection with a gas tube surge protection device within the cable taps 36, but gas tube surge protection devices are not commonly used with grounding blocks because of the relative expense associated with such devices and the perceived satisfactory protection available from the common grounding connection. The other disadvantage of using a gas tube surge protection device with a grounding block is that the arrangement is not fully effective. The gas tube surge protection device is located at the cable taps 36 (FIG. 2), but the cable taps 36 are separated by drop cables 38 from the network interface devices 10. A lightning strike or other surge condition unexpectedly applied to one of the drop cables 38 will be conducted directly to the interface device 10 which has no surge protection, as well as to the cable tap 36. Any protection provided by the grounding block, whether or not it includes a gas tube surge protection device, is not assuredly available to the network interface device 10, because the adverse surge can be conducted directly to the network interface device 10 and avoid the gas tube surge protection device in the cable tap 36.

Incorporating the gas tube surge protection device 192 in the network interface device 10, as shown in FIG. 3, offers a greater capability to protect against higher voltage and higher current surges and against repeated surges. The gas tube surge protection device 192 remains functional in response to higher voltage and higher current surges than can be responded to by inductor-capacitor circuits, metal oxide varistors and avalanche diodes. The gas tube surge protection device 192 also offers a capability to resist a greater number of multiple surges compared to other known previous devices. While the previous devices may respond to a moderate number of moderate level surges, the number of such responses is limited. After that number is exceeded, such previous devices tend to fail even in response to moderate surge conditions.

Locating the gas tube surge protection device 192 in the network interface device 10 provides the best level of protection against high voltage and high current surges arising within the CATV network infrastructure and arising from active and passive subscriber equipment connected to the network interface device 10. Downstream surges will be suppressed as they enter the network interface device 10 from the CATV network infrastructure. Even though it is unlikely that a surge condition will originate at the subscriber equipment connected to the interface device 10, the gas tube surge protection device 192 will provide protection for the other components within the CATV network 20 from upstream surges.

Incorporating the gas tube surge protection device 192 in the network interface device 10 also offers economic advantages, which are translated into a lower cost to the CATV service provider. The increased cost arising from incorporating the gas tube surge protection device 192 in the network interface device 10 is more than offset by avoiding the necessity to occasionally replace entire failed network interface devices and/or other components within the CATV network infrastructure. A gas tube surge protection device which is satisfactory for use in the network interface device is part number BAS230V supplied by CITEL INC, of Miami, Fla., USA.

As described above, there are numerous advantages and improvements available from the present invention. The upstream noise mitigation circuits (100 and 160, FIGS. 3 and 7) respond to the instantaneous power of upstream signals. When the instantaneous power exceeds a predetermined threshold, a signal path for conducting the upstream signal to the CATV network is immediately established. Establishing the upstream communication path immediately when the instantaneous power of the upstream signal exceeds the threshold substantially reduces or diminishes the risk that information contained in the upstream signal will be lost, truncated or diminished. The risk of truncating or losing information in the upstream signal is considerably reduced or diminished compared to devices which integrate the power of the upstream signal over a time period before establishing the upstream communication path. By responding to the instantaneous power, the information in valid upstream signals is preserved. On the other hand, the upstream noise mitigation circuits 100 and 160 (FIGS. 3 and 7) offer the capability of quickly isolating and terminating the upstream communication path and thereby minimizing the ingress noise entering the CATV network.

In addition, the incorporation of the gas tube surge protection device within the network interface device itself offers substantial protective and economic advantages over the previous known uses of surge protection devices for CATV networks.

Many other advantages and improvements will be apparent upon gaining a complete appreciation for the present invention. The preferred embodiments of the invention and many of its improvements have been described with a degree of particularity. This detailed description is of preferred examples of implementing the invention and is not necessarily intended to limit the scope of the invention. The scope of the invention is defined by the following claims.

The invention claimed is:

1. A noise-mitigation device for connecting subscriber equipment to a cable television (CATV) network, the device comprising:
   a noise mitigation circuit comprising:
      at least one switch having an active state and a default state, wherein, in the active state, the at least one switch is configured to permit an upstream signal to pass, and in the default state, the at least one switch is configured to block the upstream signal from passing;
      a detector configured to determine whether the upstream signal has a power level that is above a power threshold; and
      a first timer configured to expire after a first duration that is at least equal to a maximum time for a single valid upstream data packet to pass through an upstream signal path,
   wherein the noise mitigation circuit is configured to move the at least one switch to the active state and substantially simultaneously initiate the first timer at least partially in response to the detector determining that the power level is above the power threshold, and
   wherein the noise mitigation circuit is further configured to set the at least one switch in the default state at least partially in response to the first timer expiring and the detector determining that the power level is below the power threshold.

2. The device of claim 1, further comprising:
   an input port configured to be connected to the CATV network;
   at least one subscriber port configured to be connected to the subscriber equipment; and
   a downstream signal path configured to transmit a downstream signal from the input port to the at least one subscriber port, wherein the downstream signal path comprises at least one filter configured to filter signals in an upstream frequency band,
wherein the upstream signal path is configured to transmit the upstream signal from the at least one subscriber port to the input port.

3. The device of claim 1, wherein the power threshold is adjustable.

4. The device of claim 1, wherein the upstream signal path further comprises a second timer configured to expire after a second duration that is less than the first duration, wherein the noise mitigation circuit is further configured to:
initiate the second timer when the detector determines that the power level of the upstream signal is above the power threshold;
determine that the power level of the upstream signal is below the power threshold when the second timer expires; and
set the at least one switch to the default state at least partially in response to the detector determining that the power level of the upstream signal is below the power threshold, prior to expiration of the first duration.

5. The device of claim 4, wherein:
the detector comprises a comparator and a log amplifier detector;
the log amplifier detector is configured to provide a signal representative of the power level of the upstream signal to the comparator;
the comparator is configured to compare the power level of the upstream signal, as represented by the signal from the log amplifier detector, with the power threshold; and
the comparator is further configured to provide a comparator signal representing that the upstream signal is noise when the power level is below the threshold.

6. The device of claim 5, wherein the noise mitigation circuit further comprises:
an integrator circuit configured to integrate the comparator signal, so as to provide an integrator signal representative of whether the upstream signal is transient noise that is above the power threshold, wherein the integrator circuit is configured to integrate the comparator signal in response to initiation of the second timer; and
a latch having an output that is connected to the at least one switch, wherein the at least one switch is configured to be set in the active state when the latch provides an active signal thereto from the output, and in the default state otherwise, and wherein the latch comprises:
a set node configured to activate when the comparator signal represents that the signal is above the power threshold;
a reset node configured to activate when either or both of:
the integrator signal represents that the upstream signal is transient noise, and the second timer is expired; or
the latch provides the active signal to the at least one switch, the first timer is expired, and the comparator signal indicates that the upstream signal is below the power threshold,
wherein the latch is configured to provide the active signal when the set is activated, until the reset is activated.

7. The device of claim 1, wherein the first duration is at least equal to the maximum time for the single valid upstream data packet to pass through the upstream signal path plus an additional amount of time to account for inherent tolerances in the device.

8. The device of claim 1, wherein the device operates without demodulating frequencies within the upstream signal.

9. A noise-mitigation device for connecting subscriber equipment to a cable television (CATV) network, comprising:
a first timer configured to expire a first time duration after the first timer is initiated, wherein the first time duration is at least equal to a maximum time for a single valid upstream data packet to pass through an upstream signal path of the device; and
at least one switch connected to the first timer, wherein the at least one switch is configured to have an active state that allows an upstream signal to pass through the upstream signal path, and a default state that checks the upstream signal from passing through the upstream signal path,
wherein the at least one switch is configured to be in the default state after the first time duration expires.

10. The device of claim 9, further comprising:
an input port configured to be connected to the CAW network; and
at least one subscriber port configured to be connected to the subscriber equipment,
wherein the upstream signal path extends from the at least one subscriber port to the input port, and
wherein the first time duration is at least equal to the maximum time for the single valid upstream data packet to pass through the upstream signal path plus an additional amount of time to account for inherent tolerances in the device.

11. The device of claim 10, further comprising a downstream signal path extending between the input port and the subscriber port, wherein:
the downstream signal path comprises one or more downstream filters configured to filter signals outside of a downstream frequency band,
the upstream signal path comprises one or more upstream filters configured to filter signals outside of an upstream frequency hand, and
the upstream frequency band and the downstream frequency bands are non-overlapping.

12. The device of claim 9, further comprising:
a detector connected to the first timer and the at least one switch, wherein the detector is configured to determine a power level of the upstream signal, determine whether the upstream signal is noise based at least partially on a comparison of the power level to a power threshold, and provide a detector signal representing that the upstream signal is not noise, wherein the first timer is configured to be initiated when the detector provides the detector signal to the first timer, and wherein the at least one switch is configured to be in the active state at least partially in response to the detector providing the detector signal.

13. The device of claim 12, further comprising a second timer configured to expire a second time duration after initiation of the second timer, the second time duration being less than the first time duration, wherein:
the second timer is configured to initiate substantially simultaneously with the first timer being initiated;
the detector is configured to again determine whether the upstream signal is noise based at least partially on a second comparison of the power level of the upstream signal to the power threshold, in response to the second timer expiring; and the at least one switch is configured to be set to the default state at least partially in response to the detector determining that the upstream signal is noise after the expiration of the second timer and before the expiration of the first timer.

14. The device of claim 13, wherein:

the detector comprises a comparator and a log amplifier detector;

the log amplifier detector is configured to provide a signal representative of the power level of the upstream signal to the comparator;

the comparator is configured to compare the power level of the upstream signal, as represented by the signal from the log amplifier detector, with the power threshold; and the comparator is configured to provide a comparator signal representing that the upstream signal is noise when the power level is below the threshold.

15. The device of claim 14, further comprising an integrator circuit configured to integrate the comparator signal, so as to provide an integrator signal representative of whether the upstream signal is transient noise that is above the power threshold, wherein the integrator circuit is configured such that initiation of the second timer causes the integrator circuit to integrate the comparator signal.

16. The device of claim 15, further comprising a latch having an output that is connected to the at least one switch, wherein the at least one switch is configured to be in the active state when the latch provides an active signal thereto from the output, and in the default state otherwise, and wherein the latch comprises:

a set node configured to activate hen the comparator signal represents that the signal is above the power threshold;

a reset node configured to activate when either or both of:
the integrator signal represents that the upstream signal is transient noise, and the second timer is expired; or
the latch provides the active signal to the at least one switch, the first timer is expired, and the comparator signal indicates that the upstream signal is below the power threshold, wherein the latch is configured to provide the active signal when the set is activated, until the reset is activated.

17. A noise-mitigation device for connecting subscriber equipment to a cable television (CATV) network, the device comprising:

a circuit configured to:
compare a power level of an upstream signal to a power threshold;
communicate, for at least a transmission time duration, the upstream signal at least partially in response to the power level of the upstream signal being above the power threshold, the transmission time duration being at least equal to a time required for a data packet to be transmitted;
after the transmission time duration expires, block communication of the upstream signal; and
determine whether the upstream signal is below the power threshold after a first timer expires, wherein the first timer is configured to expire after a first time duration that is at least equal to a maximum time for a single valid upstream data packet to pass through an upstream signal path.

18. The device of claim 17, wherein the power threshold is static.

19. The device of claim 17, further comprising:

a first port coupled to the circuit and configured to receive a downstream signal from the CATV network and to provide the upstream signal to the CATV network; and a second port coupled to the circuit and configured to receive the downstream signal from the first port and to receive the upstream signal from the subscriber equipment.

20. The device of claim 19, further comprising a downstream signal path configured to transmit the downstream signal in a first, downstream signal frequency band from the first port to the second port, and prevent transmission of signals outside of the first, downstream signal frequency band from the first port to the second port.

21. The device of claim 20, wherein the upstream signal path is configured to transmit signals in a second, upstream data signal frequency band from the second port to the first port, the second frequency band being different from the first frequency band, wherein the circuit is part of the upstream path.

22. The device of claim 19, wherein the circuit further comprises a second timer, wherein:

the first timer is configured to expire the first time duration after initiation, the first time duration being shorter than the transmission time duration;

the second timer is configured to expire at a second time duration after initiation, the second time duration being substantially equal to the transmission time duration;

the first and second timers are configured to be initiated at least partially in response to power level of the upstream signal being above the power threshold; and the circuit is configured to block signals from communicating from the second port to the first port after the first timer expires and before the second timer expires at least partially in response to determining that the upstream signal below the threshold.

23. The device of claim 22, wherein the circuit further comprises an integrator configured to integrate the upstream signal during the first time duration after initiation of the first timer.

24. The device of claim 17, wherein the circuit comprises:

at least one switch in the upstream signal path, wherein the at least one switch has an active state in which the at least one switch is configured to allow the upstream signals to pass through the upstream signal path, and a default state in which the at least one switch is configured to block the upstream signal from passing through the upstream signal path.

25. The device of claim 17, wherein the first time duration is at least equal to the maximum time required for the single valid upstream data packet to pass through the upstream signal path plus an additional amount of time to account for inherent tolerances in the device.

* * * * *

UNITED STATES PATENT AND TRADEMARK OFFICE
CERTIFICATE OF CORRECTION

PATENT NO. : 10,187,673 B2
APPLICATION NO. : 15/988537
DATED : January 22, 2019
INVENTOR(S) : Charles F. Newby, Gregory F. Halik and Matthew Kellogg Page 1 of 1

It is certified that error appears in the above-identified patent and that said Letters Patent is hereby corrected as shown below:

In the Claims

Column 27, Claim 16, Line 35, "activate hen the" should read --activate when the--

Signed and Sealed this
Twenty-third Day of April, 2019

Andrei Iancu
*Director of the United States Patent and Trademark Office*